(12) United States Patent
Kan et al.

(10) Patent No.: US 12,340,297 B1
(45) Date of Patent: Jun. 24, 2025

(54) SYSTEM, METHOD, AND COMPUTER PROGRAM PRODUCT FOR GENERATING AND IMPROVING MULTITASK LEARNING MODELS

(71) Applicant: Visa International Service Association, San Francisco, CA (US)

(72) Inventors: Xi Kan, Austin, TX (US); Sheng Wang, Austin, TX (US); Dan Wang, Cedar Park, TX (US); Shuo Wang, Cedar Park, TX (US); Fengyi Gao, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/848,346

(22) PCT Filed: Feb. 20, 2024

(86) PCT No.: PCT/US2024/016445
§ 371 (c)(1),
(2) Date: Sep. 18, 2024

(51) Int. Cl.
*G06N 3/045* (2023.01)
*G06N 3/08* (2023.01)

(52) U.S. Cl.
CPC ............. *G06N 3/045* (2023.01); *G06N 3/08* (2013.01)

(58) Field of Classification Search
CPC ................................. G06N 3/045; G06N 3/08
USPC .......................................................... 706/12
See application file for complete search history.

(56) References Cited

U.S. PATENT DOCUMENTS

| 10,521,718 | B1 | 12/2019 | Szegedy et al. |
| 2018/0268292 | A1 | 9/2018 | Choi et al. |
| 2020/0143249 | A1 | 5/2020 | Georgiadis |
| 2020/0167690 | A1* | 5/2020 | Zhao ............... G06N 3/084 |
| 2021/0166123 | A1 | 6/2021 | Zonooz et al. |
| 2021/0192357 | A1 | 6/2021 | Sinha et al. |
| 2022/0245516 | A1 | 8/2022 | Kan et al. |
| 2022/0300851 | A1* | 9/2022 | Park ............... G06V 10/82 |

(Continued)

FOREIGN PATENT DOCUMENTS

CN           109670621 A           4/2019

OTHER PUBLICATIONS

Li et al., "Computational Intelligence and Intelligent Systems", 9th International Symposium, ISICA 2017, 2017 Revised Selected Papers, Part I.

*Primary Examiner* — Juan A Torres
(74) *Attorney, Agent, or Firm* — The Webb Law Firm

(57) ABSTRACT

Systems, methods, and computer program products are provided for generating and improving multitask learning models. An example method includes determining a first accuracy metric based on at least two machine learning models performing a plurality of tasks, receiving a multitask learning model including at least one shared layer and a plurality of task-specific layers, determining a second accuracy metric based on the multitask learning model having a first number of shared layers, determining a third accuracy metric based on the multitask learning model having a second number of shared layers, comparing the accuracy metrics, repeating until at least one termination condition is satisfied, and determining a target number of shared layers for the multitask learning model based on at least one of the second accuracy metric, the third accuracy metric, the first number of shared layers, the second number of shared layers, or any combination thereof.

20 Claims, 11 Drawing Sheets

(56) References Cited

U.S. PATENT DOCUMENTS

| | | | | |
|---|---|---|---|---|
| 2023/0267307 A1* | 8/2023 | Wang | ...................... | G06N 3/006 |
| | | | | 706/25 |
| 2023/0419164 A1* | 12/2023 | Mrini | ................... | G06N 3/0455 |
| 2024/0078792 A1* | 3/2024 | Cheng | ................. | G06V 10/454 |
| 2024/0330676 A1* | 10/2024 | Gaopande | .............. | G06V 10/82 |

* cited by examiner

SYSTEM, METHOD, AND COMPUTER PROGRAM PRODUCT FOR GENERATING AND IMPROVING MULTITASK LEARNING MODELS

CROSS REFERENCE TO RELATED APPLICATION

This application is the United States national phase of International Patent Application No. PCT/US24/16445 filed Feb. 20, 2024, the disclosure of which is hereby incorporated by reference in its entirety.

BACKGROUND

1. Technical Field

This disclosure relates generally to multitask learning models and, in some non-limiting embodiments or aspects, to systems, methods, and computer program products for generating and improving multitask learning models.

2. Technical Considerations

Machine learning models are successful in performing many real-world tasks. For example, a machine learning model may be trained to receive an input and perform a task (e.g., generate an output, such as a prediction, a classification, or the like). However, to perform multiple tasks, multiple separate machine learning models may need to be trained such that each separate machine learning model may perform a respective task. Training multiple different machine learning models may be inefficient, especially if some or all of the machine learning models share similar inputs. Additionally, when using single-task machine learning models, each single-task machine learning model may suffer from overfitting. Also, training separate single-task machine learning models may result in problems with scalability, as the number of models increases linearly as the number of tasks increases.

Moreover, it can be difficult to design a multi-task learning model. For example, it can be difficult to determine the type of sharing to use between tasks. Hard parameter sharing may include sharing layers, but it may be difficult to determine the appropriate number of layers to share. Soft parameter sharing may include using sharing weights for sharing between task-specific layers, but it may be difficult to determine the appropriate sharing weights. Additionally, soft parameter sharing may result in problems with scalability, as the size of the model (e.g., the task-specific layers) increases linearly as the number of tasks increases.

SUMMARY

Accordingly, provided are improved systems, methods, and computer program products for generating and improving multitask learning models.

According to non-limiting embodiments or aspects, provided is a computer-implemented method for generating and improving multitask learning models. An example method may include determining a first accuracy metric based on at least two machine learning models performing a plurality of tasks. Each machine learning model of the at least two machine learning models may be associated with a single task of the plurality of tasks. Each machine learning model of the at least two machine learning models may have a number of layers. A multitask learning model including at least one shared layer and a plurality of task-specific layers may be received. Each task-specific layer of the plurality of task-specific layers may be associated with one of the plurality of tasks. A counter variable may be initialized. A second accuracy metric may be determined based on the multitask learning model having a first number of shared layers equal to the number of layers minus the counter variable. A third accuracy metric may be determined based on the multitask learning model having a second number of shared layers equal to the counter variable plus one. The first accuracy metric, the second accuracy metric, and the third accuracy metric may be compared. Until at least one termination condition is satisfied, the following may be repeated: incrementing the counter variable; at least one of determining the second accuracy metric or determining the third accuracy metric (e.g., based on comparing the first accuracy metric, the second accuracy metric, and the third accuracy metric and incrementing the counter variable); and comparing the first accuracy metric, the second accuracy metric, and/or the third accuracy metric. A target number of shared layers for the multitask learning model may be determined based on at least one of the second accuracy metric, the third accuracy metric, the first number of shared layers, the second number of shared layers, or any combination thereof.

In some non-limiting embodiments or aspects, the multitask learning model may include a deep neural network.

In some non-limiting embodiments or aspects, the deep neural network may include an input layer, the at least one shared layer, and the plurality of task-specific layers. The plurality of task-specific layers may include at least one first task-specific layer associated with a first task of the plurality of tasks and at least one second task-specific layer associated with a second task of the plurality of tasks.

In some non-limiting embodiments or aspects, the at least one first task-specific layer may include a first task-specific output layer. The at least one second task-specific layer may include a second task-specific output layer.

In some non-limiting embodiments or aspects, the first accuracy metric may include an average accuracy metric based on a respective accuracy metric for each respective machine learning model of the at least two machine learning models.

In some non-limiting embodiments or aspects, the average accuracy metric may include a first F1 score. Each respective accuracy metric may include a respective F1 score for the respective machine learning model of the at least two machine learning models. The second accuracy metric may include a second F1 score. The third accuracy metric may include a third F1 score.

In some non-limiting embodiments or aspects, comparing the first accuracy metric, the second accuracy metric, and the third accuracy metric may include determining that the second accuracy metric is greater than the first accuracy metric and the third accuracy metric. Repeating at least one of determining the second accuracy metric or determining the third accuracy metric may include replacing the first accuracy metric with the second accuracy metric and repeating determining the second accuracy metric.

In some non-limiting embodiments or aspects, comparing the first accuracy metric, the second accuracy metric, and the third accuracy metric may include determining that the third accuracy metric is greater than the first accuracy metric and the second accuracy metric. Repeating at least one of determining the second accuracy metric or determining the third accuracy metric may include replacing the first accuracy metric with the third accuracy metric and repeating determining the third accuracy metric.

In some non-limiting embodiments or aspects, comparing the first accuracy metric, the second accuracy metric, and the third accuracy metric may include determining that the first accuracy metric is greater than the second accuracy metric and the third accuracy metric. Repeating at least one of determining the second accuracy metric or determining the third accuracy metric may include repeating determining the second accuracy metric and determining the third accuracy metric.

According to non-limiting embodiments or aspects, provided is a computer-implemented method for generating and improving multitask learning models. An example method may include receiving a multitask learning model comprising a plurality of sharing weights and a plurality of task-specific layers. Each task-specific layer of the plurality of task-specific layers may be associated with one of a plurality of tasks. A range of values may be determined for the plurality of sharing weights. A plurality of accuracy metrics may be determined and may include a respective accuracy metric associated with each respective sharing weight of the plurality of sharing weights having a respective value within the range of values. A target value for each sharing weight of the plurality of sharing weights may be determined based on the plurality of accuracy metrics. A plurality of predictions may be generated based on the multitask learning model having the target value for each sharing weight of the plurality of sharing weights. The plurality of predictions may include a respective prediction for each of the plurality of tasks.

In some non-limiting embodiments or aspects, determining the plurality of accuracy metrics may include performing a grid search based on the plurality of sharing weights and the range of values.

In some non-limiting embodiments or aspects, the range of values for the plurality of sharing weights may include a range from 0 to 1 with a selected interval between values in the range.

In some non-limiting embodiments or aspects, the sharing weights may include a self-task sharing weight and a different-task sharing weight.

In some non-limiting embodiments or aspects, the range of values for the plurality of sharing weights may include a range from 0 to 1, and wherein the different-task sharing weight may include 1 minus the self-task sharing weight.

In some non-limiting embodiments or aspects, determining a target value for each sharing weight may include determining the target value for each sharing weight that improves the plurality of accuracy metrics.

According to non-limiting embodiments or aspects, provided is a computer-implemented method for generating and improving multitask learning models. An example method may include determining a first accuracy metric based on at least two machine learning models performing a plurality of tasks. Each machine learning model of the at least two machine learning models may be associated with a single task of the plurality of tasks. A first multitask learning model including at least one shared layer and a plurality of task-specific layers may be received. Each task-specific layer of the plurality of task-specific layers may be associated with one of the plurality of tasks. A number of shared layers for the first multitask learning model for which at least one second accuracy metric based on the first multitask learning model is improved and is greater than the first accuracy metric may be determined. A second multitask learning model including a plurality of sharing weights and a second plurality of task-specific layers may be received. Each task-specific layer of the second plurality of task-specific layers may be associated with one of the plurality of tasks. A value for each sharing weight of the plurality of sharing weights for which at least one third accuracy metric based on the second multitask learning model is improved may be determined. A combined multitask learning model including a plurality of shared layers based on the number of shared layers, a second plurality of sharing weights based on the value for each sharing weight of the plurality of sharing weights, and a third plurality of task-specific layers may be received. Each task-specific layer of the third plurality of task-specific layers may be associated with one of the plurality of tasks. A plurality of predictions may be generated based on the combined multitask learning model, the plurality of predictions comprising a respective prediction for each of the plurality of tasks.

In some non-limiting embodiments or aspects, the first multitask learning model may include a first deep neural network. The second multitask learning model may include a second deep neural network. The combined multitask learning model may include a third deep neural network.

In some non-limiting embodiments or aspects, the first accuracy metric may include an average accuracy metric based on a respective accuracy metric for each respective machine learning model of the at least two machine learning models.

In some non-limiting embodiments or aspects, each machine learning model of the at least two machine learning models may have a number of layers. The at least one second accuracy metric may include a first intermediate accuracy metric and a second intermediate accuracy metric. Determining the number of shared layers for the first multitask model may include initializing a counter variable, determining the first intermediate accuracy metric based on the first multitask learning model having a first number of shared layers equal to the number of layers minus the counter variable, determining the second intermediate accuracy metric based on the first multitask learning model having a second number of shared layers equal to the counter variable plus one, and comparing the first accuracy metric, the first intermediate accuracy metric, and the second intermediate accuracy metric. The following may be repeated until at least one termination condition is satisfied: incrementing the counter variable; at least one of determining the first intermediate accuracy metric or determining the second intermediate accuracy metric based on comparing the first accuracy metric, the first intermediate accuracy metric, and the second intermediate accuracy metric and incrementing the counter variable; and comparing the first accuracy metric, the first intermediate accuracy metric, and the second intermediate accuracy metric. The number of shared layers for the first multitask learning model may be determined based on at least one of the first intermediate accuracy metric, the second intermediate accuracy metric, the first number of shared layers, the second number of shared layers, or any combination thereof.

In some non-limiting embodiments or aspects, the at least one third accuracy metric may include a plurality of accuracy metrics. Determining the value for each sharing weight of the plurality of sharing weights may include determining a range of values for the plurality of sharing weights, determining the plurality of accuracy metrics comprising a respective accuracy metric associated with each respective sharing weight of the plurality of sharing weights having a respective value within the range of values, and determining the value for each sharing weight of the plurality of sharing weights based on the plurality of accuracy metrics.

According to non-limiting embodiments or aspects, provided is a system for generating and improving multitask learning models. An example system may include at least one processor configured to perform any of the methods described herein.

According to non-limiting embodiments or aspects, provided is a computer program product for generating and improving multitask learning models. An example computer program product may include at least one non-transitory computer-readable medium including program instructions that, when executed by at least one processor, cause the at least one processor to perform any of the methods described herein.

Further non-limiting embodiments or aspects are set forth in the following numbered clauses:

Clause 1: A computer-implemented method, comprising: determining, with at least one processor, a first accuracy metric based on at least two machine learning models performing a plurality of tasks, each machine learning model of the at least two machine learning models associated with a single task of the plurality of tasks, each machine learning model of the at least two machine learning models having a number of layers; receiving, with at least one processor, a multitask learning model comprising at least one shared layer and a plurality of task-specific layers, each task-specific layer of the plurality of task-specific layers associated with one of the plurality of tasks; initializing, with at least one processor, a counter variable; determining, with at least one processor, a second accuracy metric based on the multitask learning model having a first number of shared layers equal to the number of layers minus the counter variable; determining, with at least one processor, a third accuracy metric based on the multitask learning model having a second number of shared layers equal to the counter variable plus one; comparing, with at least one processor, the first accuracy metric, the second accuracy metric, and the third accuracy metric; repeating, with at least one processor, until at least one termination condition is satisfied: incrementing the counter variable; at least one of determining the second accuracy metric or determining the third accuracy metric based on comparing the first accuracy metric, the second accuracy metric, and the third accuracy metric and incrementing the counter variable; and comparing the first accuracy metric, the second accuracy metric, and the third accuracy metric; and determining, with at least one processor, a target number of shared layers for the multitask learning model based on at least one of the second accuracy metric, the third accuracy metric, the first number of shared layers, the second number of shared layers, or any combination thereof.

Clause 2: The method of clause 1, wherein the multitask learning model comprises a deep neural network.

Clause 3: The method of clause 1 or clause 2, wherein the deep neural network comprises: an input layer; the at least one shared layer; and the plurality of task-specific layers, wherein the plurality of task-specific layers comprise at least one first task-specific layer associated with a first task of the plurality of tasks and at least one second task-specific layer associated with a second task of the plurality of tasks.

Clause 4: The method of any of clauses 1-3, wherein the at least one first task-specific layer comprises a first task-specific output layer, and wherein the at least one second task-specific layer comprises a second task-specific output layer.

Clause 5: The method of any of clauses 1-4, wherein the first accuracy metric comprises an average accuracy metric based on a respective accuracy metric for each respective machine learning model of the at least two machine learning models.

Clause 6: The method of any of clauses 1-5, wherein the average accuracy metric comprises a first F1 score, wherein each respective accuracy metric comprises a respective F1 score for the respective machine learning model of the at least two machine learning models, wherein the second accuracy metric comprises a second F1 score, and wherein the third accuracy metric comprises a third F1 score.

Clause 7: The method of any of clauses 1-6, wherein comparing the first accuracy metric, the second accuracy metric, and the third accuracy metric comprises determining that the second accuracy metric is greater than the first accuracy metric and the third accuracy metric, wherein repeating at least one of determining the second accuracy metric or determining the third accuracy metric comprises: replacing the first accuracy metric with the second accuracy metric; and repeating determining the second accuracy metric.

Clause 8: The method of any of clauses 1-7, wherein comparing the first accuracy metric, the second accuracy metric, and the third accuracy metric comprises determining that the third accuracy metric is greater than the first accuracy metric and the second accuracy metric, wherein repeating at least one of determining the second accuracy metric or determining the third accuracy metric comprises: replacing the first accuracy metric with the third accuracy metric; and repeating determining the third accuracy metric.

Clause 9: The method of any of clauses 1-8, wherein comparing the first accuracy metric, the second accuracy metric, and the third accuracy metric comprises determining that the first accuracy metric is greater than the second accuracy metric and the third accuracy metric, wherein repeating at least one of determining the second accuracy metric or determining the third accuracy metric comprises: repeating determining the second accuracy metric and determining the third accuracy metric.

Clause 10: A computer-implemented method, comprising: receiving, with at least one processor, a multitask learning model comprising a plurality of sharing weights and a plurality of task-specific layers, each task-specific layer of the plurality of task-specific layers associated with one of a plurality of tasks; determining, with at least one processor, a range of values for the plurality of sharing weights; determining, with at least one processor, a plurality of accuracy metrics comprising a respective accuracy metric associated with each respective sharing weight of the plurality of sharing weights having a respective value within the range of values; determining, with at least one processor, a target value for each sharing weight of the plurality of sharing weights based on the plurality of accuracy metrics; and generating, with at least one processor, a plurality of predictions based on the multitask learning model having the target value for each sharing weight of the plurality of sharing weights, the plurality of predictions comprising a respective prediction for each of the plurality of tasks.

Clause 11: The method of clause 10, wherein determining the plurality of accuracy metrics comprises performing a grid search based on the plurality of sharing weights and the range of values.

Clause 12: The method of clause 10 or clause 11, wherein the range of values for the plurality of sharing weights comprises a range from 0 to 1 with a selected interval between values in the range.

Clause 13: The method of any of clauses 10-12, wherein the sharing weights comprise a self-task sharing weight and a different-task sharing weight.

Clause 14: The method of any of clauses 10-13, wherein the range of values for the plurality of sharing weights comprises a range from 0 to 1, and wherein the different-task sharing weight comprises 1 minus the self-task sharing weight.

Clause 15: The method of any of clauses 10-14, wherein determining a target value for each sharing weight comprises determining the target value for each sharing weight that improves the plurality of accuracy metrics.

Clause 16: A computer-implemented method, comprising: determining, with at least one processor, a first accuracy metric based on at least two machine learning models performing a plurality of tasks, each machine learning model of the at least two machine learning models associated with a single task of the plurality of tasks; receiving, with at least one processor, a first multitask learning model comprising at least one shared layer and a plurality of task-specific layers, each task-specific layer of the plurality of task-specific layers associated with one of the plurality of tasks; determining, with at least one processor, a number of shared layers for the first multitask learning model for which at least one second accuracy metric based on the first multitask learning model is improved and is greater than the first accuracy metric; receiving, with at least one processor, a second multitask learning model comprising a plurality of sharing weights and a second plurality of task-specific layers, each task-specific layer of the second plurality of task-specific layers associated with one of the plurality of tasks; determining, with at least one processor, a value for each sharing weight of the plurality of sharing weights for which at least one third accuracy metric based on the second multitask learning model is improved; receiving, with at least one processor, a combined multitask learning model comprising a plurality of shared layers based on the number of shared layers, a second plurality of sharing weights based on the value for each sharing weight of the plurality of sharing weights, and a third plurality of task-specific layers, each task-specific layer of the third plurality of task-specific layers associated with one of the plurality of tasks; and generating, with at least one processor, a plurality of predictions based on the combined multitask learning model, the plurality of predictions comprising a respective prediction for each of the plurality of tasks.

Clause 17: The method of clause 16, wherein the first multitask learning model comprises a first deep neural network, wherein the second multitask learning model comprises a second deep neural network, and wherein the combined multitask learning model comprises a third deep neural network.

Clause 18: The method of clause 16 or clause 17, wherein the first accuracy metric comprises an average accuracy metric based on a respective accuracy metric for each respective machine learning model of the at least two machine learning models.

Clause 19: The method of any of clauses 16-18, wherein each machine learning model of the at least two machine learning models has a number of layers, wherein the at least one second accuracy metric comprises a first intermediate accuracy metric and a second intermediate accuracy metric, and wherein determining the number of shared layers for the first multitask model comprises: initializing a counter variable; determining the first intermediate accuracy metric based on the first multitask learning model having a first number of shared layers equal to the number of layers minus the counter variable; determining the second intermediate accuracy metric based on the first multitask learning model having a second number of shared layers equal to the counter variable plus one; comparing the first accuracy metric, the first intermediate accuracy metric, and the second intermediate accuracy metric; repeating until at least one termination condition is satisfied: incrementing the counter variable; at least one of determining the first intermediate accuracy metric or determining the second intermediate accuracy metric based on comparing the first accuracy metric, the first intermediate accuracy metric, and the second intermediate accuracy metric and incrementing the counter variable; and comparing the first accuracy metric, the first intermediate accuracy metric, and the second intermediate accuracy metric; and determining the number of shared layers for the first multitask learning model based on at least one of the first intermediate accuracy metric, the second intermediate accuracy metric, the first number of shared layers, the second number of shared layers, or any combination thereof.

Clause 20: The method of any of clauses 16-19, wherein the at least one third accuracy metric comprises a plurality of accuracy metrics, and wherein determining the value for each sharing weight of the plurality of sharing weights comprises: determining a range of values for the plurality of sharing weights; determining the plurality of accuracy metrics comprising a respective accuracy metric associated with each respective sharing weight of the plurality of sharing weights having a respective value within the range of values; and determining the value for each sharing weight of the plurality of sharing weights based on the plurality of accuracy metrics.

Clause 21: A system comprising: at least one processor configured to perform the method of any of clauses 1-20.

Clause 22: A computer program product comprising at least one non-transitory computer-readable medium including program instructions that, when executed by at least one processor, cause the at least one processor to perform the method of any of clauses 1-20.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments or aspects that are illustrated in the accompanying schematic figures, in which.

DETAILED DESCRIPTION

Figure 1:
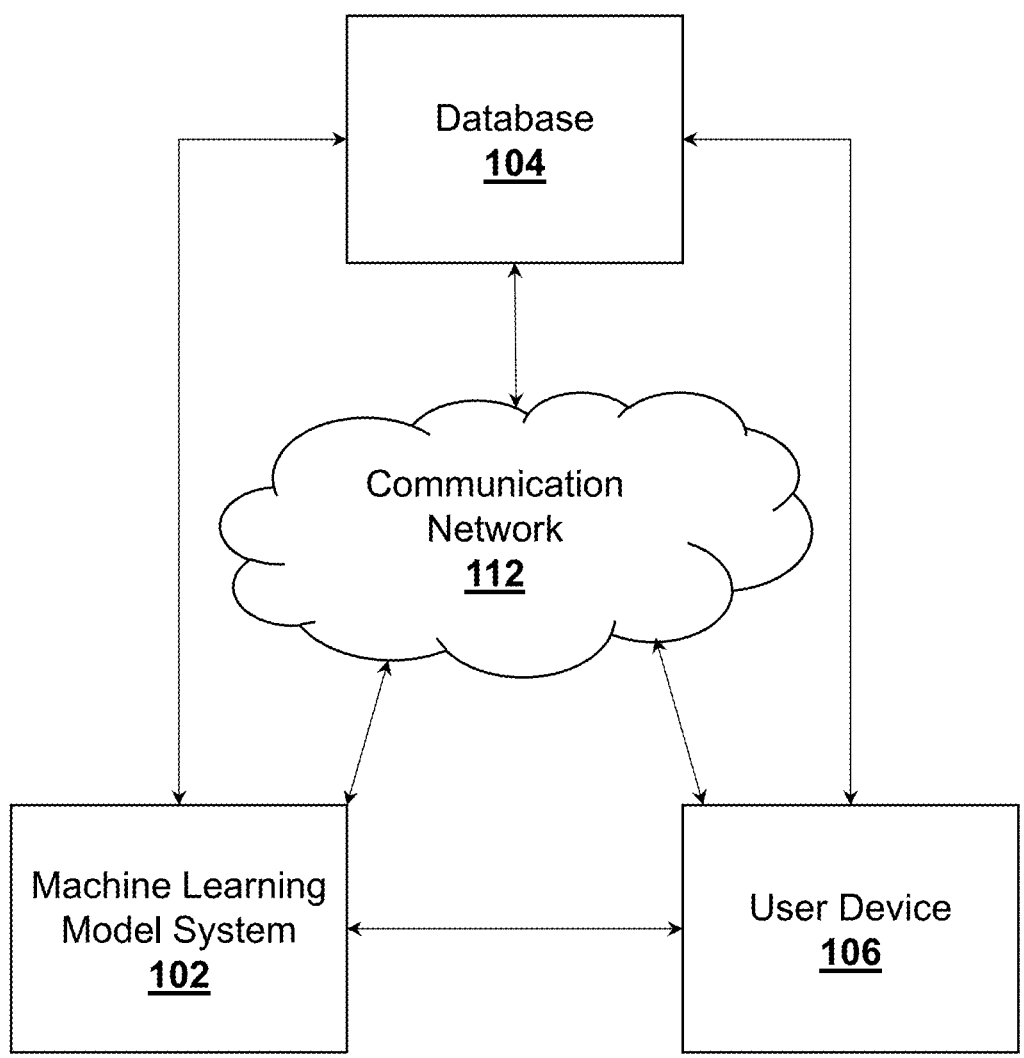
FIG. 1 is a schematic diagram of a system for generating and improving multitask learning models, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like)

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature.

Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer (e.g., laptop computer, a tablet computer, and/or the like), a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors.

For example, as used in the specification and the claims, a first device, a first server, or a first processor that is recited as performing a first step or a first function may refer to the same or different device, server, or processor recited as performing a second step or a second function.

Non-limiting embodiments or aspects of the disclosed subject matter are directed to systems, methods, and computer program products for generating and improving multitask learning models. For example, non-limiting embodiments or aspects of the disclosed subject matter provide determining a baseline accuracy metric based on multiple single-task machine learning models, receiving a first multitask learning model with at least one shared layer, determining a number of shared layers for the first multitask learning model for which at least one second accuracy metric is improved and is greater than the baseline accuracy metric, receiving a second multitask learning model with sharing weights, determining a value for each sharing weight for which at least one third accuracy metric is improved, receiving a combined multitask learning model with the determined number of shared layers and the determined sharing weights as well as task-specific layers, and generating predictions (e.g., a respective prediction for each task) using the combined multitask learning model. Such embodiments or aspects provide for performing multiple tasks with a single machine learning model in a manner that improves efficiency and accuracy (e.g., compared to multiple single-task machine learning models). For example, the combined multitask learning model can be trained to perform all tasks at once, thereby increasing efficiency. Moreover, the shared layers and/or sharing weights help to avoid overfitting to any single task. Also, the combined multitask learning model is scalable since the shared layers ensure that the size and/or complexity of the model does not increase linearly as the number of tasks increases. Furthermore, such embodiments or aspects enable determination of the number of shared layers (e.g., optimized number of shared layers) that improves performance. Moreover, such embodiments or aspects enable determination of sharing weights (e.g., optimized values of sharing weights) that improves performance.

Additionally, non-limiting embodiments or aspects of the disclosed subject matter provide determining a baseline accuracy metric based on multiple single-task machine learning models, receiving a (first) multitask learning model comprising at least one shared layer and a plurality of task-specific layers, initializing a counter variable, determining a second accuracy metric based on the multitask learning model having a first number of shared layers equal to the number of layers minus the counter variable, determining a third accuracy metric based on the multitask learning model having a second number of shared layers equal to the counter variable plus one, comparing the accuracy metrics, and repeatedly incrementing the counter variable, determining the second and/or third accuracy metric(s), and comparing the accuracy metrics until a termination condition is satisfied in order to determine a target number of shared layers for the (first) multitask learning model (e.g., based on the second accuracy metric, the third accuracy metric, the first number of shared layers, the second number of shared layers, any combination thereof, and/or the like). Such embodiments or aspects provide for performing multiple tasks with a single machine learning model in a manner that improves efficiency and accuracy (e.g., compared to multiple single-task machine learning models). For example, the multitask learning model can be trained to perform all tasks at once, thereby increasing efficiency. Moreover, the shared layers help to avoid overfitting to any single task. Also, the multitask learning model is scalable since the shared layers ensure that the size and/or complexity of the model does not increase linearly as the number of tasks increases. Furthermore, such embodiments or aspects enable determination of the number of shared layers (e.g., optimized number of shared layers) that improves performance.

In addition, non-limiting embodiments or aspects of the disclosed subject matter provide receiving a (second) multitask learning model comprising a plurality of sharing weights and a plurality of task-specific layers, determining a range of values for the plurality of sharing weights, determining a plurality of accuracy metrics comprising a respective accuracy metric associated with each respective sharing weight having a respective value within the range of values, determining a target value for each sharing weight based on the accuracy metric(s), and generating a plurality of predictions (e.g., a respective prediction for each of the plurality of tasks) based on the multitask learning model having the target value for each sharing weight. Such embodiments or aspects provide for performing multiple tasks with a single machine learning model in a manner that improves efficiency and accuracy (e.g., compared to multiple single-task machine learning models). For example, the combined multitask learning model can be trained to perform all tasks at once, thereby increasing efficiency. Moreover, the sharing weights help to avoid overfitting to any single task. Furthermore, such embodiments or aspects enable determination of sharing weights (e.g., optimized values of sharing weights) that improves performance.

For the purpose of illustration, in the following description, while the presently disclosed subject matter is described with respect to systems, methods, and computer program products for generating and improving multitask learning models, one skilled in the art will recognize that the disclosed subject matter is not limited to the illustrative embodiments or aspects. For example, the systems, methods, and computer program products described herein may be used with a wide variety of settings, such imbalanced classes of data for any suitable type of machine learning task, e.g., prediction, recommendation, fraud detection, anomaly detection, risk detection, credit default prediction, credit application approval, transaction approval, and/or the like.

Referring now to FIG. 1, shown is an example system 100 for generating and improving multitask learning models, according to some non-limiting embodiments or aspects. As shown in FIG. 1, system 100 may include machine learning model system 102, database 104, user device 106, and/or communication network 112.

Machine learning model system 102 may include one or more devices capable of receiving information from and/or communicating information to database 104 and/or user device 106 (e.g., directly via wired or wireless communication connection, indirectly via communication network 112, and/or the like). For example, machine learning model system 102 may include a computing device, such as a server, a group of servers, a desktop computer, a portable computer, a mobile device, and/or other like devices. In some non-limiting embodiments or aspects, machine learning model system 102 may be in communication with a data storage device (e.g., database 104), which may be local or remote to machine learning model system 102. In some non-limiting embodiments or aspects, machine learning model system 102 may be capable of receiving information from, storing information in, communicating information to, or searching information stored in the data storage device (e.g., database 104).

Database 104 may include one or more devices capable of receiving information from and/or communicating information to machine learning model system 102 and/or user device 106 (e.g., directly via wired or wireless communication connection, indirectly via communication network 112, and/or the like). For example, database 104 may include a computing device, such as a server, a group of servers, a desktop computer, a portable computer, a mobile device, and/or other like devices. In some non-limiting embodiments or aspects, database 104 may include a data storage device. In some non-limiting embodiments or aspects, database 104 may be capable of receiving information from, storing information in, communicating information to, or searching information stored in the data storage device. In some non-limiting embodiments or aspects, database 104 may be part of machine learning model system 102 and/or part of the same system as machine learning model system 102.

User device 106 may include one or more devices capable of receiving information from and/or communicating information to machine learning model system 102 and/or database 104 (e.g., directly via wired or wireless communication connection, indirectly via communication network 112, and/or the like). For example, user device 106 may include a computing device, such as a mobile device, a portable computer, a desktop computer, and/or other like devices. Additionally or alternatively, each user device 106 may include a device capable of receiving information from and/or communicating information to other user devices 106 (e.g., directly via wired or wireless communication connection, indirectly via communication network 112, and/or the like). In some non-limiting embodiments or aspects, user device 106 may be part of machine learning model system 102 and/or part of the same system as machine learning model system 102. For example, machine learning model system 102, database 104, and user device 106 may all be (and/or be part of) a single system and/or a single computing device.

Communication network 112 may include one or more wired and/or wireless networks. For example, communication network 112 may include a cellular network (e.g., a long-term evolution (LTER) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2A:
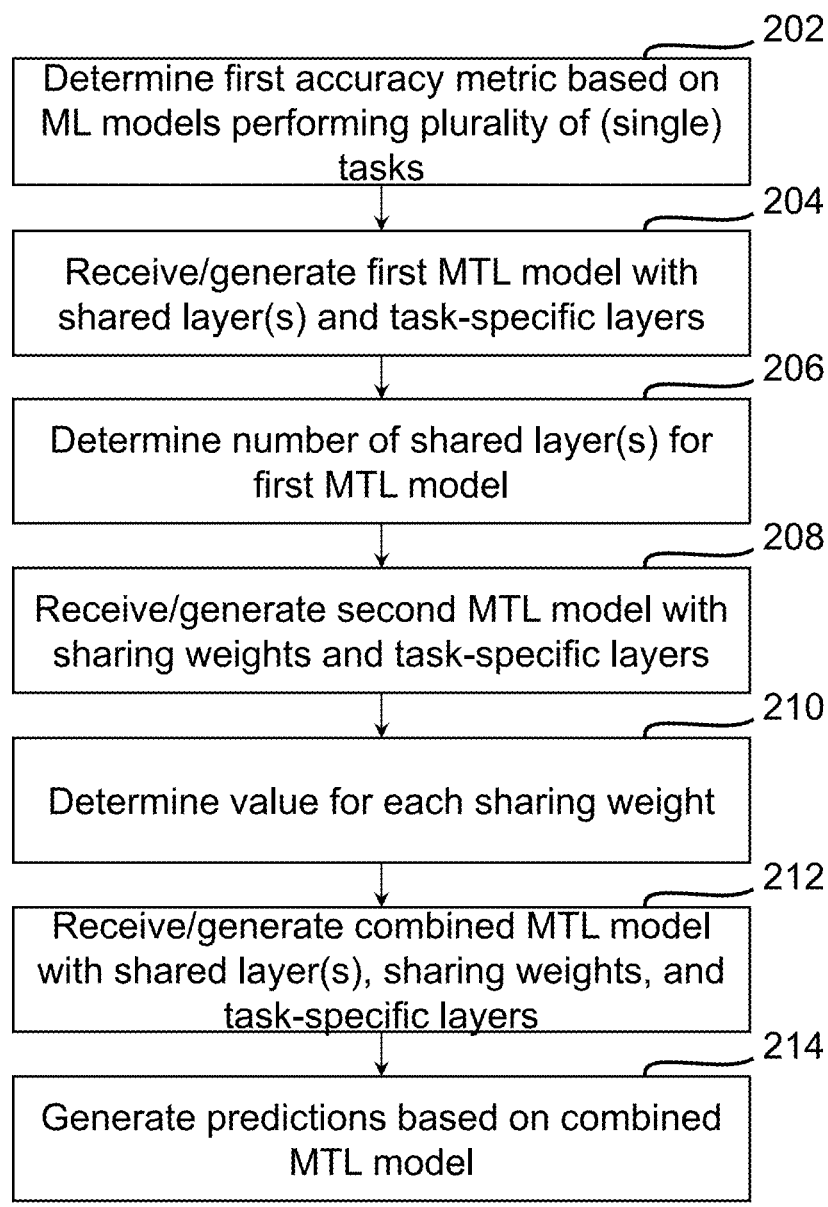
FIGS. 2A-2C are flow diagrams for methods for generating and improving multitask learning models, according to some non-limiting embodiments or aspects.

Referring now to FIG. 2A, shown is an example process 200a for generating and improving multitask learning models, according to some non-limiting embodiments or aspects. The steps shown in FIG. 2A are for example purposes only. It will be appreciated that additional, fewer, different, and/or a different order of steps may be used in non-limiting embodiments or aspects. In some non-limiting embodiments or aspects, a step may be automatically performed in response to performance and/or completion of a prior step. In some non-limiting embodiments or aspects, one or more of the steps of process 200a may be performed (e.g., completely, partially, and/or the like) by machine learning model system 102 (e.g., one or more devices of machine learning model system 102). In some non-limiting embodiments or aspects, one or more of the steps of process 200a may be performed (e.g., completely, partially, and/or the like) by another system, another device, another group of systems, or another group of devices, separate from or including machine learning model system 102, such as database 104 and/or user device 106.

As shown in FIG. 2A, at step 202, process 200a may include determining a first (e.g., baseline) accuracy metric based on machine learning models performing a plurality of (single) tasks. For example, machine learning model system 102 may determine a first accuracy metric based on at least two machine learning models (e.g., a plurality of single-task machine learning models) performing a plurality of tasks. Each machine learning model of the at least two machine learning models may be associated with a single task of the plurality of tasks.

In some non-limiting embodiments or aspects, the first accuracy metric may include an average accuracy metric based on a respective accuracy metric for each respective machine learning model of the at least two machine learning models. For example, the respective accuracy metric for each respective machine learning model may include at least one of an F1 score, a classification accuracy metric, an area under curve (AUC) metric, an error metric, a mean squared error (MSE) metric, any combination thereof, and/or the like. The first accuracy metric (e.g., average accuracy metric) may include an average (e.g., an arithmetic mean, a median, a mode, a weighted average, any combination thereof, and/or the like) based on the respective accuracy metric for each respective machine learning model (e.g., an average F1 score, an average classification accuracy, an average AUC, an average error, an average MSE, any combination thereof, and/or the like).

As shown in FIG. 2A, at step 204, process 200a may include receiving (and/or generating) a first multitask learning model with at least one shared layer and task-specific layers. For example, machine learning model system 102 may receive (and/or generate) a first multitask learning model comprising at least one shared layer and a plurality of task-specific layers. Each task-specific layer of the plurality of task-specific layers may be associated with one of the plurality of tasks.

In some non-limiting embodiments or aspects, machine learning model system 102 may receive the first multitask learning model from user device 106. In some non-limiting embodiments or aspects, machine learning model system 102 may receive (e.g., retrieve, request and receive, and/or the like) the first multitask learning model from database 104.

In some non-limiting embodiments or aspects, machine learning model system 102 may generate the first multitask learning model. For example, machine learning model system 102 may instantiate the first multitask learning model. Additionally or alternatively, machine learning model system 102 may initialize (e.g., randomly initialize and/or the like) parameter values for parameters of the first multitask learning model.

In some non-limiting embodiments or aspects, the first multitask learning model may include a first deep neural network. For example, the first multitask learning model may include at least one of a neural network, a fully connected neural network, a convolutional neural network, a tree-based encoder, any combination thereof, and/or the like.

Figure 5A:
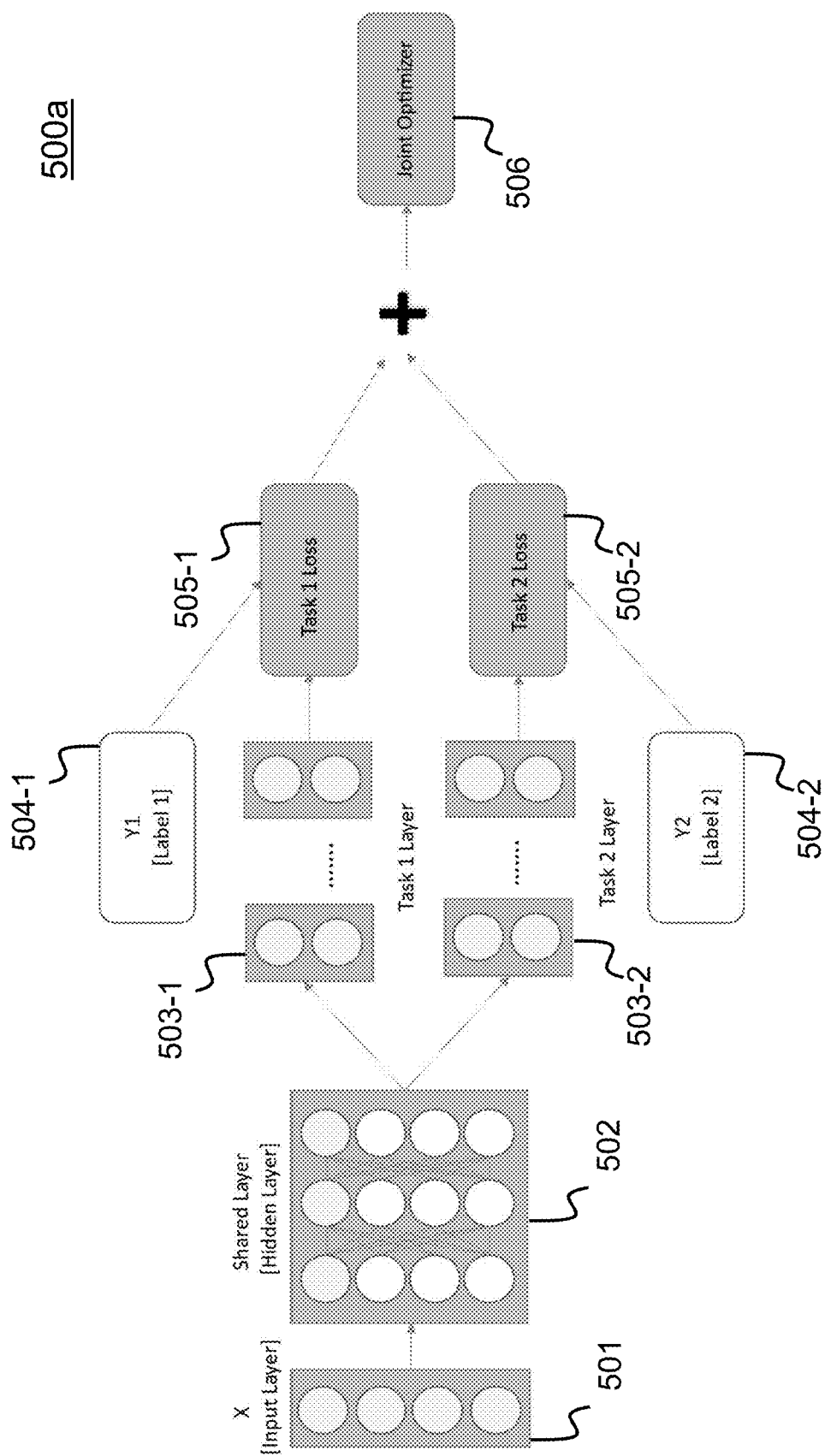
FIGS. 5A-5C are schematic diagrams of multitask learning models, according to some non-limiting embodiments or aspects.

In some non-limiting embodiments or aspects, the first multitask learning model may be the same as or similar to multitask learning model 500a of FIG. 5A. Referring now to FIG. 5A, and with continued reference to FIG. 2A, FIG. 5A shows a schematic diagram of multitask learning model 500a, according to some non-limiting embodiments or aspects. As shown in FIG. 5A, multitask learning model 500a may include an input layer 501, at least one shared layer 502 (e.g., a plurality of shared layers 502), and a plurality of task-specific layers (e.g., first task-specific layer 503-1 and second task-specific later 503-2, individually referred to as "task-specific layer 503", and collectively referred to as "task-specific layers 503"). In some non-limiting embodiments or aspects, multitask learning model 500a may additionally include and/or receive labels (e.g., first label 504-1 associated with a first task, second label 504-2 associated with a second task, individually referred to as "label 504", and collectively referred to as "labels 504"), which may be used to determine losses (e.g., first loss 505-1 associated with a first task, second loss 505-2 associated with a second task, individually referred to as "loss 505", and collectively referred to as "losses 505"). In some non-limiting embodiments or aspects, the losses 505 may be used to train multitask learning model 500a (e.g., update the parameters of multitask learning model 500a based on joint optimization 506).

In some non-limiting embodiments or aspects, input layer 501 may include a plurality of nodes (e.g., neurons, perceptrons, computational units, and/or the like). For example, input layer 501 may include a node for each feature of data to be inputted to multitask learning model 500a (e.g., a node for each element of a vector to be inputted to multitask learning model 500a). In some non-limiting embodiments or aspects, the nodes of input layer 501 may be connected to the nodes of at least one of shared layers 502 (e.g., a first shared layer 502).

In some non-limiting embodiments or aspects, each shared layer 502 may include a plurality of nodes (e.g., neurons, perceptrons, computational units, and/or the like). The number of nodes for each shared layer 502 may be the same as, greater than, or less than the number of nodes of input layer 501 and/or the number of nodes of each other shared layer 502. In some non-limiting embodiments or aspects, each shared layer 502 may include a hidden layer. In some non-limiting embodiments or aspects, the nodes of a first shared layer 502 may be connected to input layer 501. In some non-limiting embodiments or aspects, the nodes of each shared layer 502 may be connected to the nodes of a subsequent shared layer 502 and/or to at least one of task-specific layers 503.

In some non-limiting embodiments or aspects, each task-specific layer may include a plurality of nodes (e.g., neurons, perceptrons, computational units, and/or the like). The number of nodes for each task-specific layer 503 may be the same as, greater than, or less than the number of nodes of input layer 501, the number of nodes of shared layers 502, and/or the number of nodes of each other task-specific layer 503. In some non-limiting embodiments or aspects, the task-specific layers 503 associated with each task may include at least one hidden layer and/or an output layer (e.g., the output layer associated with the respective task). In some non-limiting embodiments or aspects, the nodes of a task-specific layer 503 may be connected to a shared layer 502 (e.g., the last shared layer 502). In some non-limiting embodiments or aspects, the nodes of each task-specific layer 503 may be connected to a subsequent task-specific layer 503 (except that the output layer may be the only and/or last task-specific layer, such that the output layer would not have a subsequent task-specific layer 503 to be connected to).

In some non-limiting embodiments or aspects, multitask learning model 500a may be trained (e.g., by machine learning model system 102) by inputting data to input layer 501, which may forward propagate the input to shared layers 502. The shared layers 502 (e.g., the nodes thereof) may generate intermediate outputs, which may be forward propagated to subsequent shared layers 502 and/or task-specific layers 503. The hidden task-specific layers 503 (if any) may generate intermediate outputs, which may be forward propagated to subsequent hidden task-specific layers 503 and/or to the output layer of task-specific layers 503. The output layer of task-specific layer(s) 503 associated with each task may generate a final output (e.g., prediction) for each task. The final output (e.g., prediction) associated with each task may be compared to a known value (e.g., label 504 associated with each task and/or the like), and/or losses 505 may be determined based on the final output (e.g., prediction) and the known value (e.g., label 504). For example, the losses 505 may be calculated based on a loss function and/or the like. In some embodiments, machine learning model system 102 may update (e.g., adjust) the parameters (e.g., weights, connection values, and/or the like) of multitask learning model 500a based on the losses 505 for all tasks (e.g., joint optimization 506). For example, machine learning model system 102 may update (e.g., adjust) the parameters based on back propagation, gradient calculations, and/or the like based on the losses 505 for all tasks (e.g., joint optimization 506).

As shown in FIG. 2A, at step 206, process 200a may include determining a number of shared layer(s) (e.g., a target number of shared layers) for a first multitask learning model. For example, machine learning model system 102 may determine a number of shared layers for the first multitask learning model for which at least one second accuracy metric based on the first multitask learning model is improved and is greater than the first accuracy metric.

In some non-limiting embodiments or aspects, the second accuracy metric may include at least one of an F1 score, a classification accuracy metric, an AUC metric, an error metric, an MSE metric, any combination thereof, and/or the like.

Figure 2B:
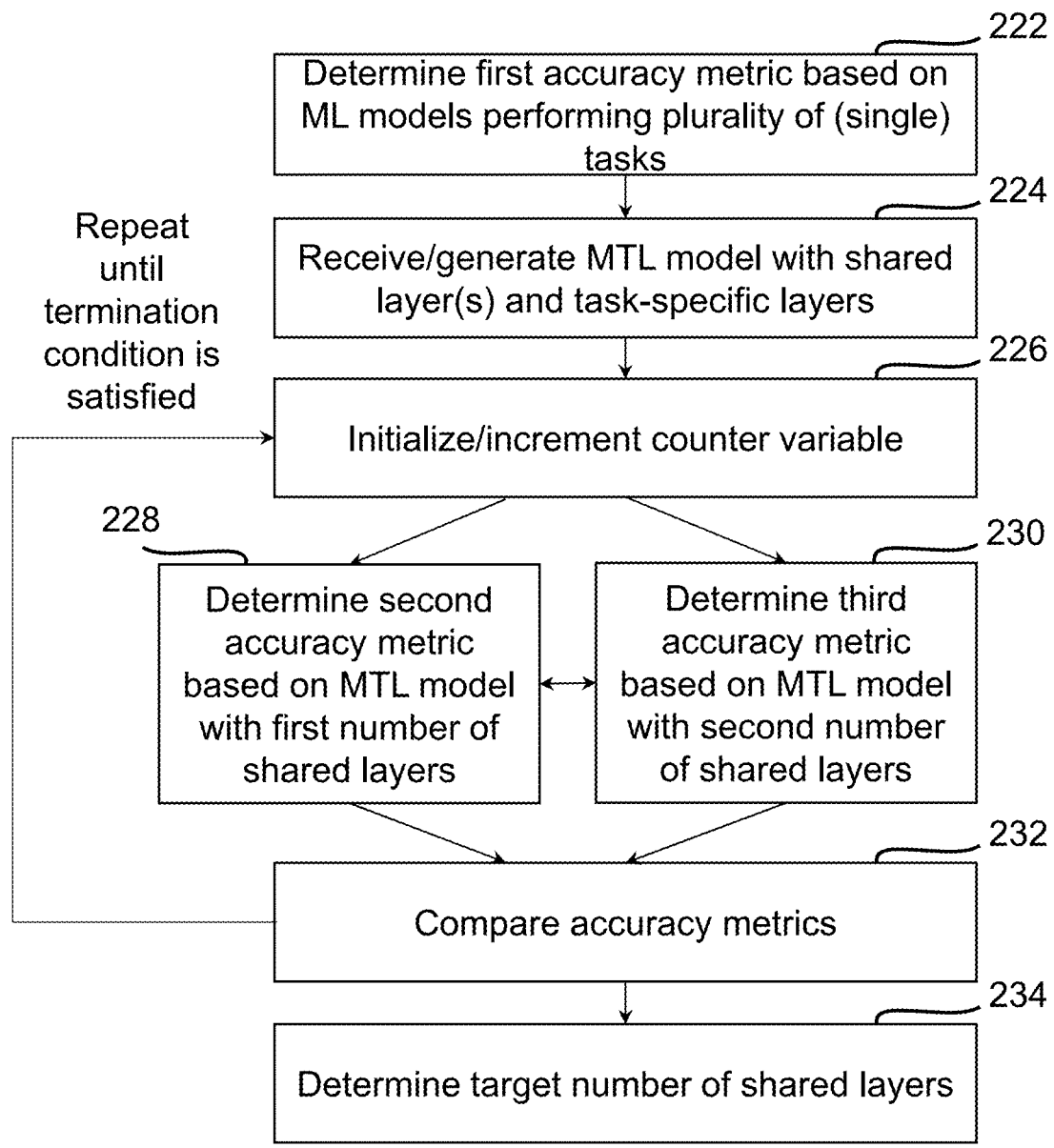

In some non-limiting embodiments or aspects, determining a number of shared layer(s) (e.g., a target number of shared layers) for the first multitask learning model may include at least some steps of process 200b of FIG. 2B, as described herein.

In some non-limiting embodiments or aspects, each machine learning model of the at least two machine learning models may have a number of layers, and the at least one second accuracy metric may include a first intermediate accuracy metric and a second intermediate accuracy metric, as described herein. Machine learning model system 102 may determine the number of shared layers for the first multitask model may include initializing a counter variable, as described herein. Machine learning model system 102 may determine a first intermediate accuracy metric based on the first multitask learning model having a first number of shared layers equal to the number of layers minus the counter variable, as described herein. Machine learning model system 102 may determine a second intermediate accuracy metric based on the first multitask learning model having a second number of shared layers equal to the counter variable plus one, as described herein. Machine learning model system 102 may compare the first accuracy metric, the first intermediate accuracy metric, and the second intermediate accuracy metric, as described herein. Machine learning model system 102 may repeat the following until at least one termination condition is satisfied: incrementing the counter variable, at least one of determining the first intermediate accuracy metric and/or determining the second intermediate accuracy metric, and comparing the first accuracy metric, the first intermediate accuracy metric, and the second intermediate accuracy metric, as described herein. Machine learning model system 102 may determine the number (e.g., target number, optimized number, and/or the like) of shared layers for the first multitask learning model based on at least one of the first intermediate accuracy metric, the second intermediate accuracy metric, the first number of shared layers, the second number of shared layers, or any combination thereof, as described herein.

As shown in FIG. 2A, at step 208, process 200*a* may include receiving (and/or generating) a second multitask learning model with sharing weights and task-specific layers. For example, machine learning model system 102 may receive a second multitask learning model comprising a plurality of sharing weights and a second plurality of task-specific layers. Each task-specific layer of the second plurality of task-specific layers associated with one of the plurality of tasks.

In some non-limiting embodiments or aspects, the second multitask learning model may include a second deep neural network. For example, the second multitask learning model may include at least one of a neural network, a fully connected neural network, a convolutional neural network, a cross-stitch network, any combination thereof, and/or the like.

Figure 5B:
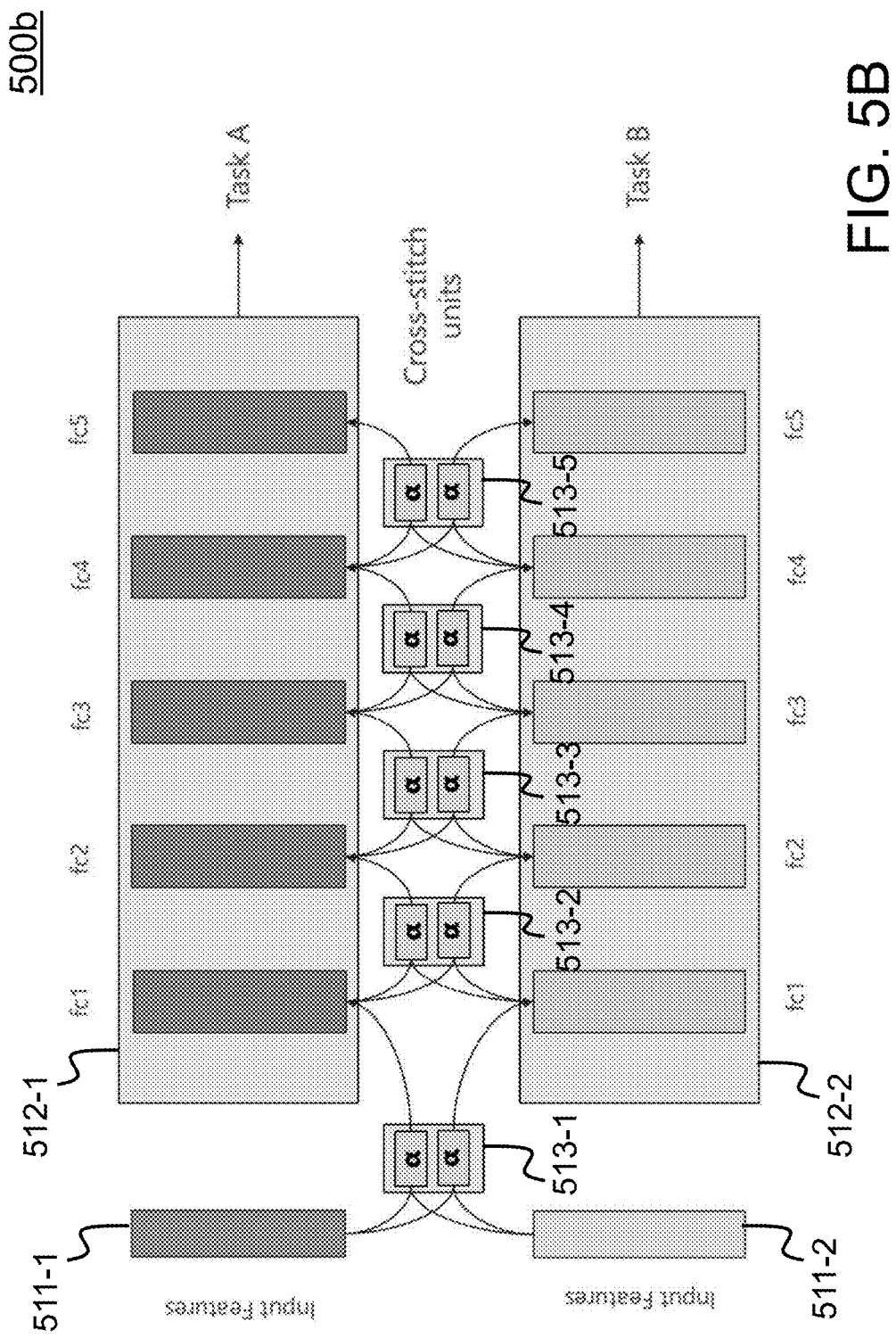

In some non-limiting embodiments or aspects, the second multitask learning model may be the same as or similar to multitask learning model 500*b* of FIG. 5B. Referring now to FIG. 5B, and with continued reference to FIG. 2A, FIG. 5B shows a schematic diagram of multitask learning model 500*b*, according to some non-limiting embodiments or aspects. As shown in FIG. 5B, multitask learning model 500*b* may include at least one input layer (e.g., first input layer 511-1 and second input layer 511-2, individually referred to as "input layer 511", and collectively referred to as "input layers 511"), a plurality of task-specific layers (e.g., first task-specific layers 512-1 and second task-specific laters 512-2, individually referred to as "task-specific layer 512", and collectively referred to as "task-specific layers 512"), and a plurality of sharing weights (e.g., sharing weights 513-1 through 513-5, individually referred to as "sharing weight 513", and collectively referred to as "sharing weights 513").

In some non-limiting embodiments or aspects, input layer(s) 511 may include a plurality of nodes (e.g., neurons, perceptrons, computational units, and/or the like). For example, input layer 501 may include a node for each feature of data to be inputted to multitask learning model 500*b* (e.g., a node for each element of a vector to be inputted to multitask learning model 500*b*). In some non-limiting embodiments or aspects, the nodes of input layer 511 may be connected to the nodes of at least one task-specific layer 512. In some non-limiting embodiments or aspects, the nodes of input layer 511 may be connected to task-specific layers 512 via sharing weights 513 (e.g., the values of the nodes of input layer 512 may be multiplied by sharing weights 513-1 before being inputted to the task-specific layers 512).

In some non-limiting embodiments or aspects, each task-specific layer 512 may include a plurality of nodes (e.g., neurons, perceptrons, computational units, and/or the like). The number of nodes for each task-specific layer 512 may be the same as, greater than, or less than the number of nodes of input layer 501. In some non-limiting embodiments or aspects, the task-specific layer 512 associated with each task may include at least one hidden layer and/or an output layer (e.g., the output layer associated with the respective task). In some non-limiting embodiments or aspects, the nodes of a task-specific layer 512 may be connected to sharing weights 513, which may be connected to the nodes of another task-specific layer 512. For example, the nodes of one of first task-specific layers 512-1 may be connected to via sharing weights 513-2 to the nodes of one of second task-specific layers 512-2 (e.g., the activation values of the nodes of fully connected layer fc1 of first task-specific layers 512-1 may be multiplied by sharing weights 513-2 before being inputted to the nodes of fully connected layer fc2 of second task-specific layers 512-2, and the activation values of the nodes of fully connected layer fc1 of second task-specific layers 512-2 may be multiplied by sharing weights 513-2 before being inputted to the nodes of fully connected layer fc2 of first task-specific layers 512-1).

In some non-limiting embodiments or aspects, multitask learning model 500*b* may be trained (e.g., by machine learning model system 102) by inputting data to input layer(s) 511, which may forward propagate the input to task-specific layers 512 via sharing weights 513. The hidden task-specific layers 512 (if any) may generate intermediate outputs, which may be forward propagated via sharing weights 513 to subsequent hidden task-specific layers 512 and/or to the output layer of task-specific layers 512. The output layer of task-specific layer(s) 512 associated with each task may generate a final output (e.g., prediction) for each task (e.g., Task A and Task B). The final output (e.g., prediction) associated with each task may be compared to a known value (e.g., a label associated with each task and/or the like), and/or losses may be determined based on the final output (e.g., prediction) and the known value (e.g., label). For example, the losses may be calculated based on a loss function and/or the like. In some embodiments, machine learning model system 102 may update (e.g., adjust) the parameters (e.g., weights, connection values, and/or the like) of multitask learning model 500*b* based on the losses for all tasks (e.g., joint optimization). For example, machine learning model system 102 may update (e.g., adjust) the parameters based on back propagation, gradient calculations, and/or the like based on the losses for all tasks.

As shown in FIG. 2A, at step 210, process 200*a* may include determining a value (e.g., target value) for each sharing weight. For example, machine learning model system 102 may determine a value for each sharing weight of the plurality of sharing weights for which at least one third accuracy metric based on the second multitask learning model is improved.

In some non-limiting embodiments or aspects, the third accuracy metric may include at least one of an F1 score, a classification accuracy metric, an AUC metric, an error metric, an MSE metric, any combination thereof, and/or the like.

Figure 2C:
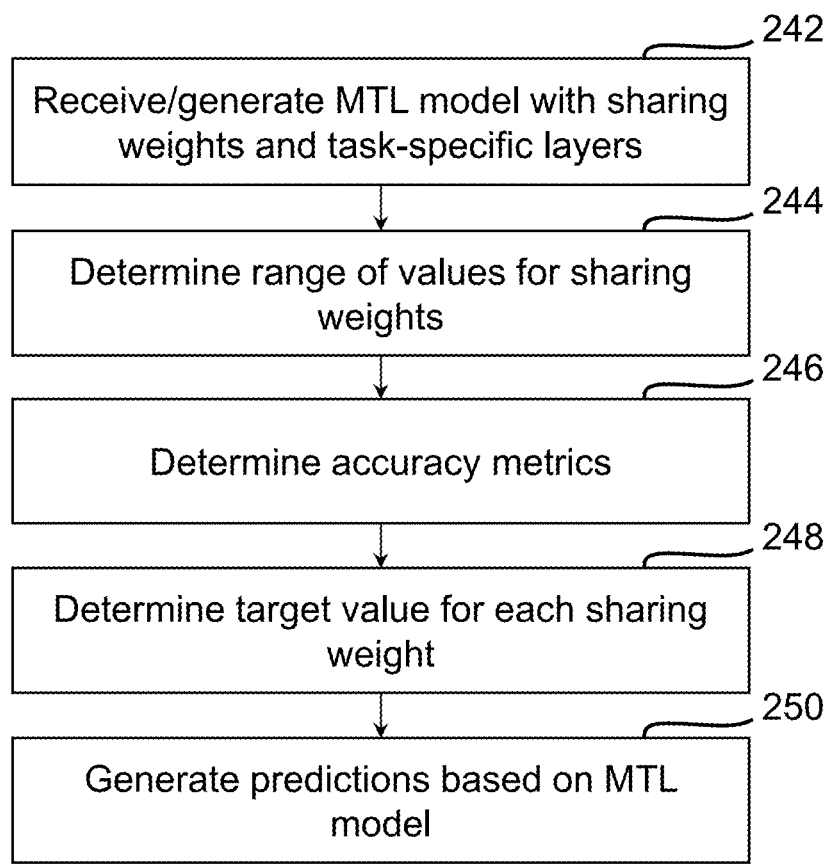

In some non-limiting embodiments or aspects, determining a value (e.g., target value) for each sharing weight may include at least some steps of process 200c of FIG. 2C, as described herein.

In some non-limiting embodiments or aspects, the at least one third accuracy metric may include a plurality of accuracy metrics, as described herein. Machine learning model system 102 may determine a range of values for the plurality of sharing weights, as described herein. Machine learning model system 102 may determine the plurality of accuracy metrics comprising a respective accuracy metric associated with each respective sharing weight of the plurality of sharing weights having a respective value within the range of values, as described herein. Machine learning model system 102 may determine the value for each sharing weight of the plurality of sharing weights based on the plurality of accuracy metrics.

As shown in FIG. 2A, at step 212, process 200a may include receiving (and/or generating) a combined multitask learning model with shared layer(s), sharing weights, and task-specific layers. For example, machine learning model system 102 may receive a combined multitask learning model comprising a plurality of shared layers based on the determined (e.g., target) number of shared layers, a second plurality of sharing weights based on the determined (e.g., target) value for each sharing weight of the plurality of sharing weights, and a third plurality of task-specific layers. Each task-specific layer of the third plurality of task-specific layers associated with one of the plurality of tasks.

In some non-limiting embodiments or aspects, the combined multitask learning model may include a third deep neural network. For example, the third multitask learning model may include at least one of a neural network, a fully connected neural network, a convolutional neural network, a tree-based encoder, a cross-stitch network, any combination thereof, and/or the like.

Figure 5C:
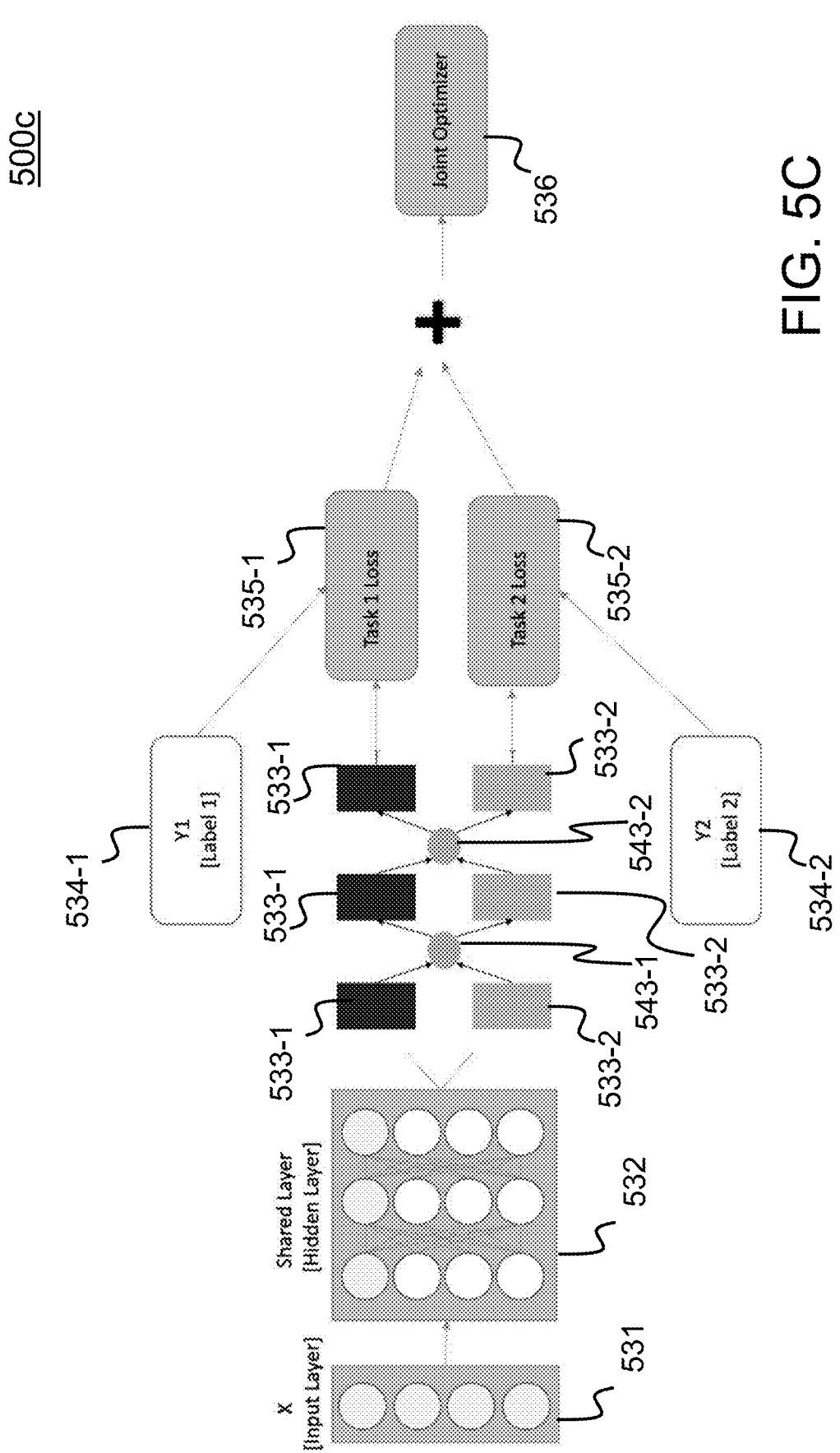

In some non-limiting embodiments or aspects, the combined multitask learning model may be the same as or similar to combined multitask learning model 500c of FIG. 5C. Referring now to FIG. 5C, and with continued reference to FIG. 2A, FIG. 5C shows a schematic diagram of combined multitask learning model 500c, according to some non-limiting embodiments or aspects. As shown in FIG. 5C, multitask learning model 500c may include an input layer 531, at least one shared layer 532 (e.g., a plurality of shared layers 532), a plurality of task-specific layers (e.g., first task-specific layers 533-1 and second task-specific layers 533-2, individually referred to as "task-specific layer 533", and collectively referred to as "task-specific layers 533"), and a plurality of sharing weights (e.g., sharing weights 543-1 and 543-2, individually referred to as "sharing weight 543", and collectively referred to as "sharing weights 543"). In some non-limiting embodiments or aspects, multitask learning model 500c may additionally include and/or receive labels (e.g., first label 534-1 associated with a first task, second label 534-2 associated with a second task, individually referred to as "label 534", and collectively referred to as "labels 534"), which may be used to determine losses (e.g., first loss 535-1 associated with a first task, second loss 535-2 associated with a second task, individually referred to as "loss 535", and collectively referred to as "losses 535"). In some non-limiting embodiments or aspects, the losses 535 may be used to train multitask learning model 500c (e.g., update the parameters of multitask learning model 500c based on joint optimization 536).

In some non-limiting embodiments or aspects, input layer 531 may include a plurality of nodes (e.g., neurons, perceptrons, computational units, and/or the like). For example, input layer 531 may include a node for each feature of data to be inputted to multitask learning model 500c (e.g., a node for each element of a vector to be inputted to multitask learning model 500c). In some non-limiting embodiments or aspects, the nodes of input layer 531 may be connected to the nodes of at least one of shared layers 532 (e.g., a first shared layer 532).

In some non-limiting embodiments or aspects, each shared layer 532 may include a plurality of nodes (e.g., neurons, perceptrons, computational units, and/or the like). The number of nodes for each shared layer 532 may be the same as, greater than, or less than the number of nodes of input layer 531 and/or the number of nodes of each other shared layer 532. In some non-limiting embodiments or aspects, each shared layer 532 may include a hidden layer. In some non-limiting embodiments or aspects, the nodes of a first shared layer 532 may be connected to input layer 531. In some non-limiting embodiments or aspects, the nodes of each shared layer 532 may be connected to the nodes of a subsequent shared layer 532 and/or to at least one of task-specific layers 533.

In some non-limiting embodiments or aspects, each task-specific layer 533 may include a plurality of nodes (e.g., neurons, perceptrons, computational units, and/or the like). The number of nodes for each task-specific layer 533 may be the same as, greater than, or less than the number of nodes of input layer 531, the number of nodes of each shared layer 532, and/or the number of nodes of each other task-specific layer 533. In some non-limiting embodiments or aspects, the task-specific layer 533 associated with each task may include at least one hidden layer and/or an output layer (e.g., the output layer associated with the respective task). In some non-limiting embodiments or aspects, the nodes of a task-specific layer 533 may be connected to sharing weights 543, which may be connected to the nodes of another task-specific layer 533. For example, the nodes of one of first task-specific layers 533-1 may be connected to via sharing weights 543-1 to the nodes of one of second task-specific layers 533-2 (e.g., the activation values of the nodes of a first one of first task-specific layers 533-1 may be multiplied by sharing weights 543-1 before being inputted to the nodes of a second one of second task-specific layers 533-2, and the activation values of the nodes of a first one of second task-specific layers 533-2 may be multiplied by sharing weights 543-1 before being inputted to the nodes of a second one of first task-specific layers 533-1).

In some non-limiting embodiments or aspects, multitask learning model 500c may be trained (e.g., by machine learning model system 102) by inputting data to input layer(s) 531, which may forward propagate the input to shared layers 532, which may forward propagate the input to task-specific layers 533, as described herein. The output layer of task-specific layer(s) 533 associated with each task may generate a final output (e.g., prediction) for each task (e.g., Task 1 and Task 2). The final output (e.g., prediction) associated with each task may be compared to a known value (e.g., label 534 associated with each task and/or the like), and/or losses 535 may be determined based on the final output (e.g., prediction) and the known value (e.g., label 534). For example, the losses 535 may be calculated based on a loss function and/or the like. In some embodiments, machine learning model system 102 may update (e.g., adjust) the parameters (e.g., weights, connection values, and/or the like) of multitask learning model 500c based on the losses 535 for all tasks (e.g., joint optimization). For example, machine learning model system 102 may update (e.g., adjust) the parameters based on back propagation, gradient calculations, and/or the like based on the losses 535 for all tasks.

As shown in FIG. 2A, at step 214, process 200a may include generating predictions based on the combined multitask learning model. For example, machine learning model system 102 may generate a plurality of predictions based on the combined multitask learning model. The plurality of predictions may include a respective prediction for each of the plurality of tasks.

In some non-limiting embodiments or aspects, machine learning model system 102 may receive (e.g., from database 104, user device 106, and/or the like) input data. Additionally or alternatively, machine learning model system 102 may generate the plurality of predictions based on the input data and the combined multitask learning model. For example, machine learning model system 102 may input the input data to the combined multitask learning model to generate the predictions.

In some non-limiting embodiments or aspects, the input data may include transaction data associated with at least one payment transaction. Additionally or alternatively, the predictions may include a plurality of predictions based on the transaction data. For example, the predictions may include at least one of the following: a prediction that the authorization amount will be the same as the clearing amount, a prediction as to when to expect a clearing message, a prediction whether there will be a single or multiple clearing message, a fraud prediction (e.g., a likelihood of fraud), a prediction whether an authorization message can be matched to a clearing message within a selected time period, an authorization prediction (e.g., a prediction as to whether a payment transaction should be authorized or not), any combination thereof, and/or the like.

Referring now to FIG. 2B, shown is an example process 200b for generating and improving multitask learning models, according to some non-limiting embodiments or aspects. The steps shown in FIG. 2B are for example purposes only. It will be appreciated that additional, fewer, different, and/or a different order of steps may be used in non-limiting embodiments or aspects. In some non-limiting embodiments or aspects, a step may be automatically performed in response to performance and/or completion of a prior step. In some non-limiting embodiments or aspects, one or more of the steps of process 200b may be performed (e.g., completely, partially, and/or the like) by machine learning model system 102 (e.g., one or more devices of machine learning model system 102). In some non-limiting embodiments or aspects, one or more of the steps of process 200b may be performed (e.g., completely, partially, and/or the like) by another system, another device, another group of systems, or another group of devices, separate from or including machine learning model system 102, such as database 104 and/or user device 106.

As shown in FIG. 2B, at step 222, process 200b may include determining a first (e.g., baseline) accuracy metric based on machine learning models performing a plurality of (single) tasks. For example, machine learning model system 102 may determine a first accuracy metric based on at least two machine learning models performing a plurality of tasks (e.g., each machine learning model of the at least two machine learning models associated with a single task of the plurality of tasks), as described herein. In some non-limiting embodiments or aspects, each machine learning model of the at least two machine learning models may have a number of layers.

In some non-limiting embodiments or aspects, the first accuracy metric may include an average accuracy metric based on a respective accuracy metric (e.g., an F1 score, a classification accuracy metric, an AUC metric, an error metric, an MSE metric, any combination thereof, and/or the like) for each respective machine learning model of the at least two machine learning models, as described herein. For example, each respective accuracy metric may include a respective F1 score for the respective machine learning model of the at least two machine learning models. The average accuracy metric may include a first F1 score (e.g., based on the respective F1 score for each respective machine learning model).

As shown in FIG. 2B, at step 224, process 200b may include receiving (and/or generating) a multitask learning model with shared layer(s) and task-specific layers. For example, machine learning model system 102 may receive a multitask learning model comprising at least one shared layer and a plurality of task-specific layers, as described herein. Each task-specific layer of the plurality of task-specific layers may be associated with one of the plurality of tasks, as described herein.

In some non-limiting embodiments or aspects, the multitask learning model may include a deep neural network, as described herein. In some non-limiting embodiments or aspects, the multitask learning model may be the same as or similar to multitask learning model 500a of FIG. 5A, as described herein.

In some non-limiting embodiments or aspects, the multitask learning model may include an input layer, at least one shared layer, and a plurality of task-specific layers, as described herein. For example, the plurality of task-specific layers may include at least one first task-specific layer associated with a first task of the plurality of tasks and at least one second task-specific layer associated with a second task of the plurality of tasks.

In some non-limiting embodiments or aspects, the at least one first task-specific layer may include a first task-specific output layer. Additionally or alternatively, the at least one second task-specific layer may include a second task-specific output layer.

As shown in FIG. 2B, at step 226, process 200b may include initializing and/or incrementing a counter variable. For example, machine learning model system 102 may initialize and/or increment a counter variable.

In some non-limiting embodiments or aspects, initializing a counter variable may include setting the counter variable equal to 0.

In some non-limiting embodiments or aspects, incrementing a counter variable may include increasing the value of the counter variable by 1.

As shown in FIG. 2B, at step 228, process 200b may include determining a second accuracy metric based on the multitask learning model having the first number of shared layers. For example, machine learning model system 102 may determine a second accuracy metric based on the multitask learning model having a first number of shared layers equal to the number of layers (of the single-task machine learning models) minus the counter variable.

In some non-limiting embodiments or aspects, the second accuracy metric may include at least one of an F1 score, a classification accuracy metric, an AUC metric, an error metric, an MSE metric, any combination thereof, and/or the like. For example, the second accuracy metric may include a second F1 score.

In some non-limiting embodiments or aspects, determining the second accuracy metric may include training the multitask learning model having the first number of shared layers. For example, machine learning system 102 may receive a training dataset, which may be used to train the multitask learning model having the first number of shared layers, as described herein (e.g., forward propagation of the inputs from the training dataset and backpropagation to update the parameters of the multitask learning model having the first number of shared layers). Additionally, machine learning model system 102 may receive a testing dataset. The second accuracy metric may be determined based on the testing dataset (e.g., machine learning system 102 may input the inputs from the testing dataset to generate predictions, and the predictions may be used to determine the second accuracy metric).

As shown in FIG. 2B, at step 230, process 200*b* may include determining a third accuracy metric based on the multitask learning model having the second number of shared layers. For example, machine learning model system 102 may determine a third accuracy metric based on the multitask learning model having a second number of shared layers equal to the counter variable plus one.

In some non-limiting embodiments or aspects, the third accuracy metric may include at least one of an F1 score, a classification accuracy metric, an AUC metric, an error metric, an MSE metric, any combination thereof, and/or the like. For example, the third accuracy metric may include a third F1 score.

In some non-limiting embodiments or aspects, determining the third accuracy metric may include training the multitask learning model having the second number of shared layers. For example, machine learning system 102 may receive a training dataset, which may be used to train the multitask learning model having the second number of shared layers, as described herein (e.g., forward propagation of the inputs from the training dataset and backpropagation to update the parameters of the multitask learning model having the second number of shared layers). Additionally, machine learning model system 102 may receive a testing dataset. The third accuracy metric may be determined based on the testing dataset (e.g., machine learning system 102 may input the inputs from the testing dataset to generate predictions, and the predictions may be used to determine the third accuracy metric).

As shown in FIG. 2B, at step 232, process 200*b* may include comparing the accuracy metric(s). For example, machine learning model system 102 may compare the first accuracy metric, the second accuracy metric, and the third accuracy metric.

In some non-limiting embodiments or aspects, at least some of steps 226, 228, 230, and/or 232 may repeat until a termination condition is satisfied. For example, machine learning model system 102 may repeat incrementing the counter variable, at least one of determining the second accuracy metric or determining the third accuracy metric (e.g., based on the previous comparison of the first, second, and third accuracy metrics), and comparing the first, second, and third accuracy metrics until at least one termination condition is satisfied.

In some non-limiting embodiments or aspects, comparing the first, second, and third accuracy metrics may include determining that the second accuracy metric is greater than the first accuracy metric and the third accuracy metric. As such, repeating at least one of determining the second accuracy metric or determining the third accuracy metric may include replacing the first accuracy metric with the second accuracy metric and repeating determining the second accuracy metric.

In some non-limiting embodiments or aspects, comparing the first, second, and third accuracy metrics may include determining that the third accuracy metric is greater than the first accuracy metric and the second accuracy metric. As such, repeating at least one of determining the second accuracy metric or determining the third accuracy metric may include replacing the first accuracy metric with the third accuracy metric and repeating determining the third accuracy metric.

In some non-limiting embodiments or aspects, comparing the first, second, and third accuracy metrics may include determining that the first accuracy metric is greater than the second accuracy metric and the third accuracy metric. As such, repeating at least one of determining the second accuracy metric or determining the third accuracy metric may include repeating both determining the second accuracy metric and determining the third accuracy metric.

In some non-limiting embodiments or aspects, a termination condition may include that the first accuracy metric is not the same as the average accuracy metric of the single task machine learning models (e.g., the first accuracy metric has been replaced at least once, as described herein) and that the first accuracy metric (e.g., after such replacement and performing another repetition of incrementing the counter variable and determining at least one of the second and/or third accuracy metric, as described herein) is greater than the second and third accuracy metrics.

As shown in FIG. 2B, at step 234, process 200*b* may include determining a target number of shared layers. For example, machine learning model system 102 may determine a target number of shared layers for the multitask learning model based on at least one of the first accuracy metric, the second accuracy metric, the third accuracy metric, the first number of shared layers, the second number of shared layers, or any combination thereof.

In some non-limiting embodiments or aspects, after repetition has stopped due to satisfying a termination condition, the number of shared layers that resulted in the greatest accuracy metric may be selected as the target number of shared layers.

In some non-limiting embodiments or aspects, machine learning model system 102 may generate predictions based on the multitask learning model, as described herein. For example, machine learning model system 102 may receive (e.g., from database 104, user device 106, and/or the like) input data. Additionally or alternatively, machine learning model system 102 may generate the plurality of predictions based on the input data and the multitask learning model. For example, machine learning model system 102 may input the input data to the multitask learning model to generate the predictions.

In some non-limiting embodiments or aspects, the input data may include transaction data associated with at least one payment transaction. Additionally or alternatively, the predictions may include a plurality of predictions based on the transaction data. For example, the predictions may include at least one of the following: a prediction that the authorization amount will be the same as the clearing amount, a prediction as to when to expect a clearing message, a prediction whether there will be a single or multiple clearing message, a prediction whether an authorization message can be matched to a clearing message within a selected time period, a fraud prediction (e.g., a likelihood of fraud), an authorization prediction (e.g., a prediction as to whether a payment transaction should be authorized or not), any combination thereof, and/or the like.

Referring now to FIG. 2C, shown is an example process 200c for generating and improving multitask learning models, according to some non-limiting embodiments or aspects. The steps shown in FIG. 2C are for example purposes only. It will be appreciated that additional, fewer, different, and/or a different order of steps may be used in non-limiting embodiments or aspects. In some non-limiting embodiments or aspects, a step may be automatically performed in response to performance and/or completion of a prior step. In some non-limiting embodiments or aspects, one or more of the steps of process 200c may be performed (e.g., completely, partially, and/or the like) by machine learning model system 102 (e.g., one or more devices of machine learning model system 102). In some non-limiting embodiments or aspects, one or more of the steps of process 200c may be performed (e.g., completely, partially, and/or the like) by another system, another device, another group of systems, or another group of devices, separate from or including machine learning model system 102, such as database 104 and/or user device 106.

As shown in FIG. 2C, at step 242, process 200c may include receiving (and/or generating) a multitask learning model with sharing weights and task-specific layers. For example, machine learning model system 102 may receive a multitask learning model comprising a plurality of sharing weights and a plurality of task-specific layers, as described herein. For example, each task-specific layer of the plurality of task-specific layers may be associated with one of a plurality of tasks, as described herein.

In some non-limiting embodiments or aspects, the multitask learning model may be the same as or similar to multitask learning model 500b of FIG. 5B, as described herein.

As shown in FIG. 2C, at step 244, process 200c may include determining a range of values for the sharing weights. For example, machine learning model system 102 may determine a range of values for the plurality of sharing weights, as described herein.

In some non-limiting embodiments or aspects, the range of values for the plurality of sharing weights may include a range from 0 to 1 with a selected interval between values in the range. For example, if the selected interval is 0.1, then the possible values for each sharing weight within the range of values may include 0, 0.1, 0.2, 0.3, 0.4, 0.5, 0.6, 0.7, 0.8, 0.9, and 1.0.

In some non-limiting embodiments or aspects, the sharing weights may include a self-task sharing weight and a different-task sharing weight, as described herein. For example, the activation values of a task-specific layer (e.g., of nodes of the task-specific layer) may be multiplied by the self-task sharing weight to generate an intermediate output to be inputted to a next task-specific layer associated with the same task. Additionally or alternatively, the activation values (e.g., of nodes of) a task-specific layer may be multiplied by the different-task sharing weight to generate an intermediate output to be inputted to a next task-specific layer associated with a different task.

In some non-limiting embodiments or aspects, the different-task sharing weight may be determined based on the self-task sharing weight (e.g., or vice versa). For example, if the range of values for the sharing weights include a range from 0 to 1, the different-task sharing weight may include 1 minus the self-task sharing weight.

As shown in FIG. 2C, at step 246, process 200c may include determining accuracy metrics. For example, machine learning model system 102 may determine a plurality of accuracy metrics including a respective accuracy metric associated with each respective sharing weight of the plurality of sharing weights having a respective value within the range of values.

In some non-limiting embodiments or aspects, determining the plurality of accuracy metrics may include performing a grid search based on the plurality of sharing weights and the range of values. For example, machine learning system 102 may receive a training dataset, which may be used to train the multitask learning model having a first set of values including a respective value within the range of values for each respective sharing weight of the plurality of sharing weights, as described herein (e.g., forward propagation of the inputs from the training dataset and backpropagation to update the parameters of the multitask learning model). Additionally, machine learning model system 102 may receive a testing dataset. A respective accuracy metric (e.g., for the first set of values) may be determined based on the testing dataset (e.g., machine learning system 102 may input the inputs from the testing dataset to generate predictions, and the predictions may be used to determine the accuracy metric). The value for at least one of the sharing weights from the first set of values may be changed (e.g., to provide a second set of values), and the process may be repeated (e.g., the machine learning model may be trained and the respective accuracy metric may be determined) for each possible set of values (e.g., all permutations of each sharing weight having each possible value in the range of values).

As shown in FIG. 2C, at step 248, process 200c may include determining a target value for each sharing weight. For example, machine learning model system 102 may determine a target value for each sharing weight of the plurality of sharing weights based on the plurality of accuracy metrics.

In some non-limiting embodiments or aspects, determining a target value for each sharing weight may include determining the target value for each sharing weight that improves the plurality of accuracy metrics.

In some non-limiting embodiments or aspects, after the grid search has been completed, the value for each sharing weight that resulted in the greatest accuracy metric may be selected as the target value for each sharing weight.

As shown in FIG. 2C, at step 250, process 200c may include generating predictions based on multitask learning model. For example, machine learning model system 102 may generate a plurality of predictions based on the multitask learning model having the target value for each sharing weight of the plurality of sharing weights. For example, the plurality of predictions comprising a respective prediction for each of the plurality of tasks.

In some non-limiting embodiments or aspects, machine learning model system 102 may generate predictions based on the multitask learning model, as described herein. For example, machine learning model system 102 may receive (e.g., from database 104, user device 106, and/or the like) input data. Additionally or alternatively, machine learning model system 102 may generate the plurality of predictions based on the input data and the multitask learning model.

For example, machine learning model system 102 may input the input data to the multitask learning model to generate the predictions.

In some non-limiting embodiments or aspects, the input data may include transaction data associated with at least one payment transaction. Additionally or alternatively, the predictions may include a plurality of predictions based on the transaction data. For example, the predictions may include at least one of the following: a prediction that the authorization amount will be the same as the clearing amount, a prediction as to when to expect a clearing message, a prediction whether there will be a single or multiple clearing message, a prediction whether an authorization message can be matched to a clearing message within a selected time period, a fraud prediction (e.g., a likelihood of fraud), an authorization prediction (e.g., a prediction as to whether a payment transaction should be authorized or not), any combination thereof, and/or the like.

Figure 3:
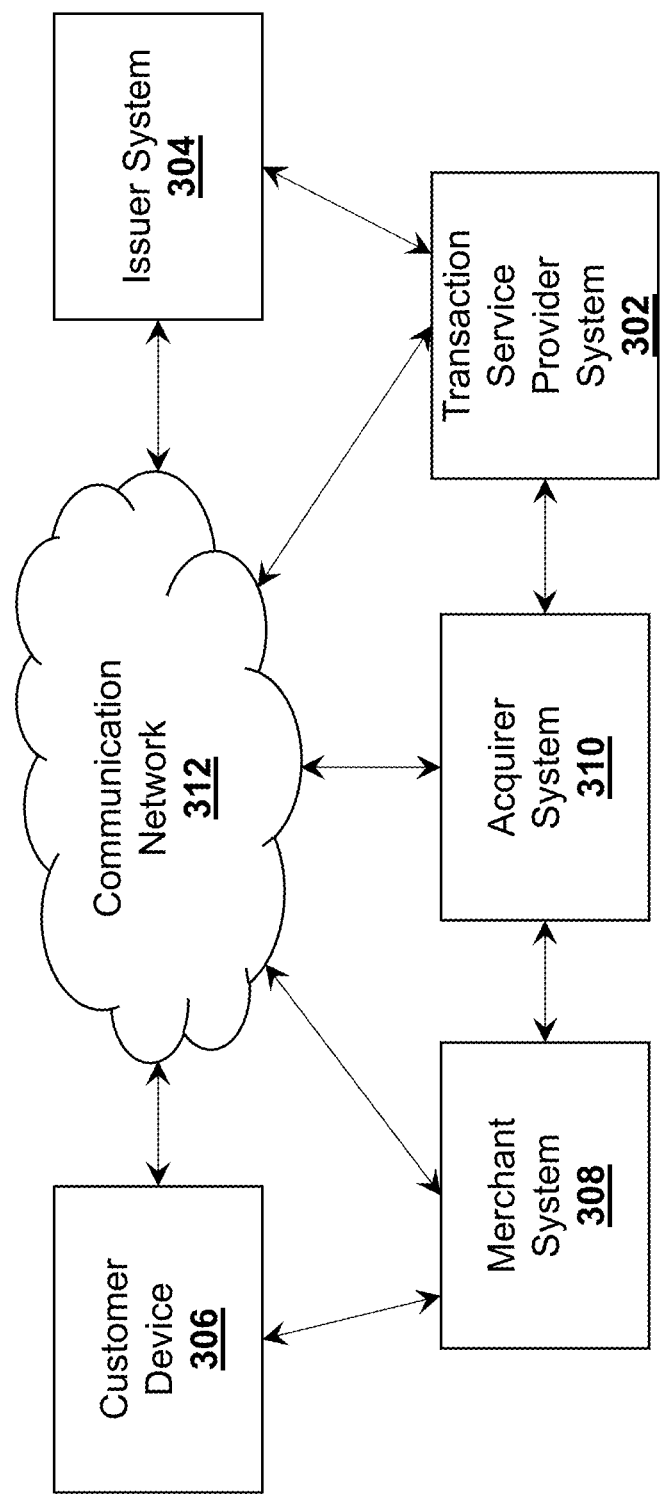
FIG. 3 is a diagram of an exemplary environment in which methods, systems, and/or computer program products, described herein, may be implemented, according to some non-limiting embodiments or aspects.

Referring now to FIG. 3, depicted is a diagram of a non-limiting embodiment or aspect of an exemplary environment 300 in which systems, products, and/or methods, as described herein, may be implemented. As shown in FIG. 3, environment 300 may include transaction service provider system 302, issuer system 304, customer device 306, merchant system 308, acquirer system 310, and communication network 312. In some non-limiting embodiments or aspects, each of machine learning model system 102, database 104, and/or user device 106 of FIG. 1 may be implemented by (e.g., part of) transaction service provider system 302. In some non-limiting embodiments or aspects, at least one of machine learning model system 102, database 104, and/or user device 106 of FIG. 1 may be implemented by (e.g., part of) another system, another device, another group of systems, or another group of devices, separate from or including transaction service provider system 302, such as issuer system 304, customer device 306, merchant system 308, acquirer system 310, and/or the like. For example, user device 106 may be implemented by (e.g., part of) at least one of issuer system 304, customer device 306, merchant system 308, and/or acquirer system 310.

Transaction service provider system 302 may include one or more devices capable of receiving information from and/or communicating information to issuer system 304, customer device 306, merchant system 308, and/or acquirer system 310 via communication network 312. For example, transaction service provider system 302 may include a computing device, such as a server (e.g., a transaction processing server), a group of servers, and/or other like devices. In some non-limiting embodiments or aspects, transaction service provider system 302 may be associated with a transaction service provider as described herein. In some non-limiting embodiments or aspects, transaction service provider system 302 may be in communication with a data storage device, which may be local or remote to transaction service provider system 302. In some non-limiting embodiments or aspects, transaction service provider system 302 may be capable of receiving information from, storing information in, communicating information to, or searching information stored in the data storage device.

Issuer system 304 may include one or more devices capable of receiving information and/or communicating information to transaction service provider system 302, customer device 306, merchant system 308, and/or acquirer system 310 via communication network 312. For example, issuer system 304 may include a computing device, such as a server, a group of servers, and/or other like devices. In some non-limiting embodiments or aspects, issuer system 304 may be associated with an issuer institution as described herein. For example, issuer system 304 may be associated with an issuer institution that issued a credit account, debit account, credit card, debit card, and/or the like to a user associated with customer device 306.

Customer device 306 may include one or more devices capable of receiving information from and/or communicating information to transaction service provider system 302, issuer system 304, merchant system 308, and/or acquirer system 310 via communication network 312. Additionally or alternatively, each customer device 306 may include a device capable of receiving information from and/or communicating information to other customer devices 306 via communication network 312, another network (e.g., an ad hoc network, a local network, a private network, a virtual private network, and/or the like), and/or any other suitable communication technique. For example, customer device 306 may include a client device and/or the like. In some non-limiting embodiments or aspects, customer device 306 may or may not be capable of receiving information (e.g., from merchant system 308 or from another customer device 306) via a short-range wireless communication connection (e.g., an NFC communication connection, an RFID communication connection, a Bluetooth® communication connection, a Zigbee® communication connection, and/or the like), and/or communicating information (e.g., to merchant system 308) via a short-range wireless communication connection.

Merchant system 308 may include one or more devices capable of receiving information from and/or communicating information to transaction service provider system 302, issuer system 304, customer device 306, and/or acquirer system 310 via communication network 312. Merchant system 308 may also include a device capable of receiving information from customer device 306 via communication network 312, a communication connection (e.g., an NFC communication connection, an RFID communication connection, a Bluetooth® communication connection, a Zigbee® communication connection, and/or the like) with customer device 306, and/or the like, and/or communicating information to customer device 306 via communication network 312, the communication connection, and/or the like. In some non-limiting embodiments or aspects, merchant system 308 may include a computing device, such as a server, a group of servers, a client device, a group of client devices, and/or other like devices. In some non-limiting embodiments or aspects, merchant system 308 may be associated with a merchant as described herein. In some non-limiting embodiments or aspects, merchant system 308 may include one or more client devices. For example, merchant system 308 may include a client device that allows a merchant to communicate information to transaction service provider system 302. In some non-limiting embodiments or aspects, merchant system 308 may include one or more devices, such as computers, computer systems, and/or peripheral devices capable of being used by a merchant to conduct a transaction with a user. For example, merchant system 308 may include a POS device and/or a POS system.

Acquirer system 310 may include one or more devices capable of receiving information from and/or communicating information to transaction service provider system 302, issuer system 304, customer device 306, and/or merchant system 308 via communication network 312. For example, acquirer system 310 may include a computing device, a server, a group of servers, and/or the like. In some non-limiting embodiments or aspects, acquirer system 310 may be associated with an acquirer as described herein.

Communication network 312 may include one or more wired and/or wireless networks. For example, communication network 312 may include a cellular network (e.g., a long-term evolution (LTER) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

For the purpose of illustration, processing a transaction may include generating a transaction message (e.g., authorization request and/or the like) based on an account identifier of a customer (e.g., associated with customer device 306 and/or the like) and/or transaction data associated with the transaction. For example, merchant system 308 (e.g., a client device of merchant system 308, a POS device of merchant system 308, and/or the like) may initiate the transaction, e.g., by generating an authorization request (e.g., in response to receiving the account identifier from a portable financial device of the customer and/or the like). Additionally or alternatively, merchant system 308 may communicate the authorization request to acquirer system 310. Additionally or alternatively, acquirer system 310 may communicate the authorization request to transaction service provider system 302. Additionally or alternatively, transaction service provider system 302 may communicate the authorization request to issuer system 304. Issuer system 304 may determine an authorization decision (e.g., authorize, decline, and/or the like) based on the authorization request, and/or issuer system 304 may generate an authorization response based on the authorization decision and/or the authorization request. Additionally or alternatively, issuer system 304 may communicate the authorization response to transaction service provider system 302. Additionally or alternatively, transaction service provider system 302 may communicate the authorization response to acquirer system 310, which may communicate the authorization response to merchant system 308.

For the purpose of illustration, clearing and/or settlement of a transaction may include generating a message (e.g., clearing message and/or the like) based on an account identifier of a customer (e.g., associated with customer device 306 and/or the like) and/or transaction data associated with the transaction. For example, merchant system 308 may generate at least one clearing message (e.g., a plurality of clearing messages, a batch of clearing messages, and/or the like). Additionally or alternatively, merchant system 308 may communicate the clearing message(s) to acquirer system 310. Additionally or alternatively, acquirer system 310 may communicate the clearing message(s) to transaction service provider system 302. Additionally or alternatively, transaction service provider system 302 may communicate the clearing message(s) to issuer system 304. Additionally or alternatively, issuer system 304 may generate at least one settlement message based on the clearing message(s). Additionally or alternatively, issuer system 304 may communicate the settlement message(s) and/or funds to transaction service provider system 302 (and/or a settlement bank system associated with transaction service provider system 302). Additionally or alternatively, transaction service provider system 302 (and/or the settlement bank system) may communicate the settlement message(s) and/or funds to acquirer system 310, which may communicate the settlement message(s) and/or funds to merchant system 308 (and/or an account associated with merchant system 308).

The number and arrangement of systems, devices, and/or networks shown in FIG. 3 are provided as an example. There may be additional systems, devices, and/or networks; fewer systems, devices, and/or networks; different systems, devices, and/or networks; and/or differently arranged systems, devices, and/or networks than those shown in FIG. 3. Furthermore, two or more systems or devices shown in FIG. 3 may be implemented within a single system or device, or a single system or device shown in FIG. 3 may be implemented as multiple, distributed systems or devices. Additionally or alternatively, a set of systems (e.g., one or more systems) or a set of devices (e.g., one or more devices) of environment 300 may perform one or more functions described as being performed by another set of systems or another set of devices of environment 300.

Figure 4:
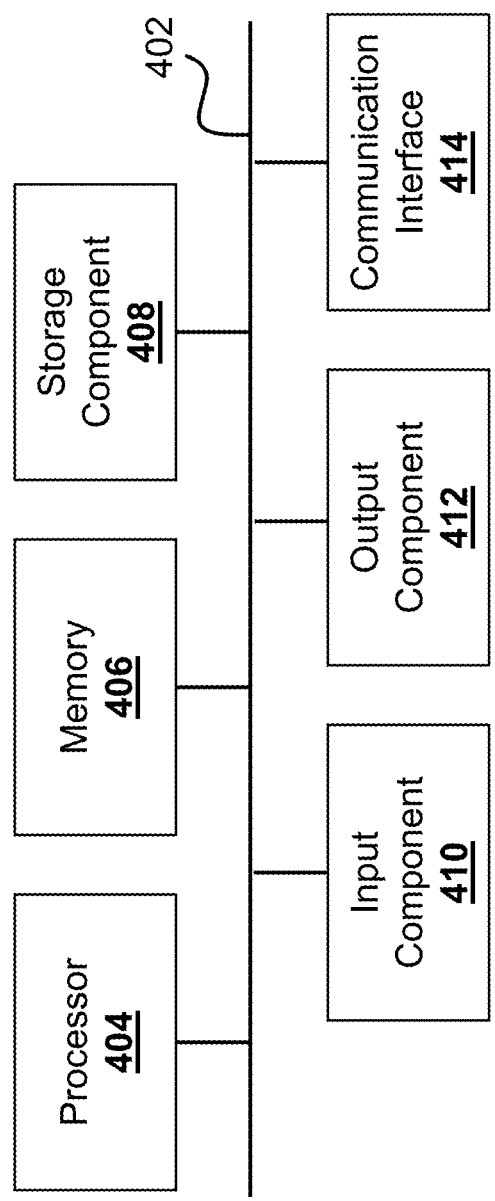
FIG. 4 is a schematic diagram of example components of one or more devices of FIG. 1 and/or FIG. 3, according to some non-limiting embodiments or aspects.

Referring now to FIG. 4, shown is a diagram of example components of a device 400 according to non-limiting embodiments. Device 400 may correspond to machine learning model system 102, database 104, and/or user device 106 of FIG. 1 and/or transaction service provider system 302, issuer system 304, customer device 306, merchant system 308, acquirer system 310, and communication network 312 of FIG. 3, as an example. In some non-limiting embodiments, such systems or devices may include at least one device 400 and/or at least one component of device 400. The number and arrangement of components shown are provided as an example. In some non-limiting embodiments, device 400 may include additional components, fewer components, different components, or differently arranged components than those shown. Additionally or alternatively, a set of components (e.g., one or more components) of device 400 may perform one or more functions described as being performed by another set of components of device 400.

As shown in FIG. 4, device 400 may include a bus 402, a processor 404, memory 406, a storage component 408, an input component 410, an output component 412, and a communication interface 414. Bus 402 may include a component that permits communication among the components of device 400. In some non-limiting embodiments, processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read only memory (ROM), and/or another type of dynamic or static storage device (e.g., flash memory, magnetic memory, optical memory, etc.) that stores information and/or instructions for use by processor 404.

With continued reference to FIG. 4, storage component 408 may store information and/or software related to the operation and use of device 400. For example, storage component 408 may include a hard disk (e.g., a magnetic disk, an optical disk, a magneto-optic disk, a solid-state disk, etc.) and/or another type of computer-readable medium. Input component 410 may include a component that permits device 400 to receive information, such as via user input (e.g., a touch screen display, a keyboard, a keypad, a mouse, a button, a switch, a microphone, etc.). Additionally or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.).

Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium may include any non-transitory memory device. A memory device includes memory space located inside of a single physical storage device or memory space spread across multiple physical storage devices. Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 6A:
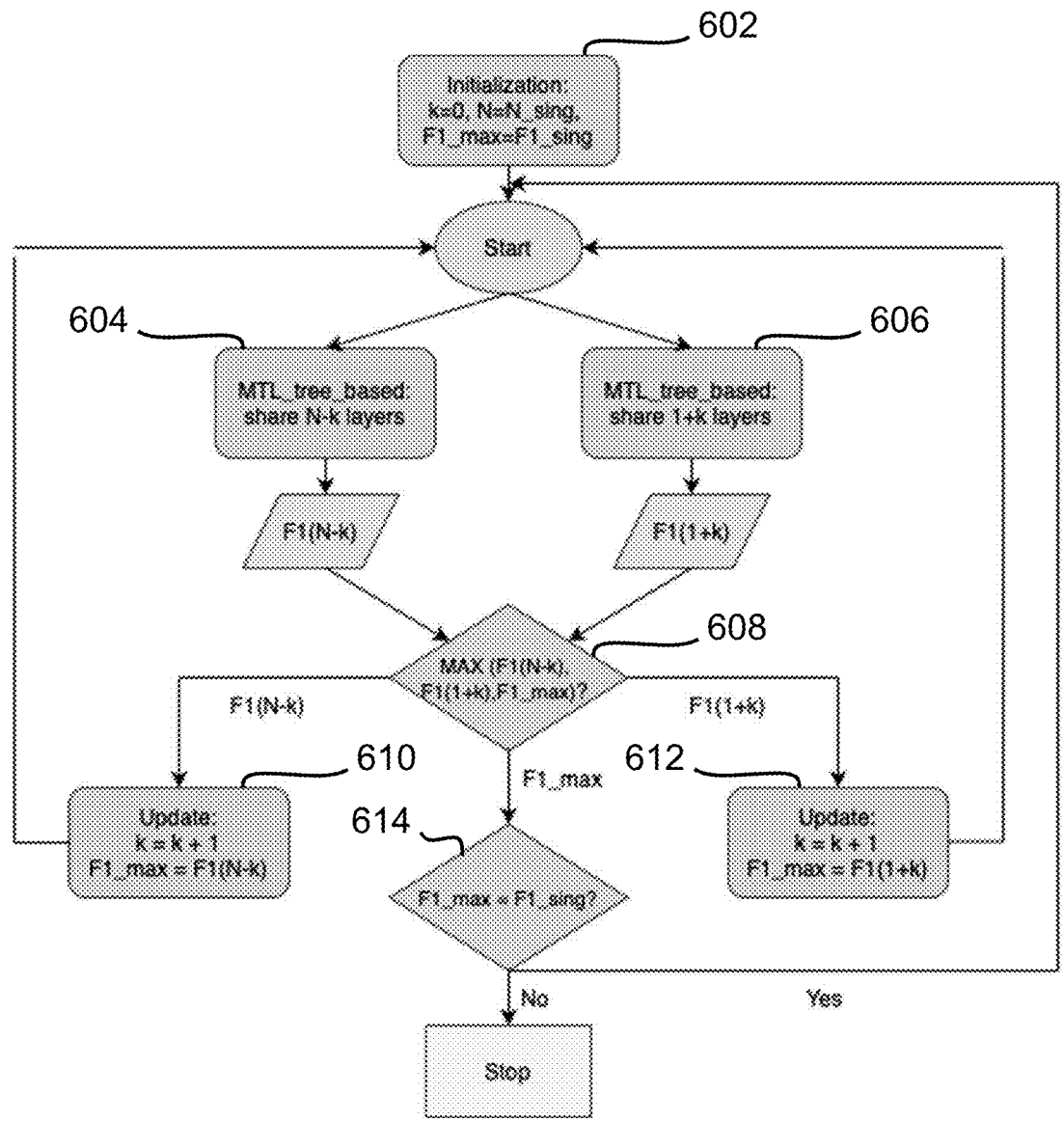
FIGS. 6A and 6B are diagrams of implementations of methods for generating and improving multitask learning models, according to some non-limiting embodiments or aspects.

Referring now to FIG. 6A, shown is a flow diagram of an example implementation 600a of a method for generating and improving multitask learning models, according to some non-limiting embodiments or aspects. The steps shown in FIG. 6A are for example purposes only. It will be appreciated that additional, fewer, different, and/or a different order of steps may be used in non-limiting embodiments or aspects. In some non-limiting embodiments or aspects, a step may be automatically performed in response to performance and/or completion of a prior step. In some non-limiting embodiments or aspects, one or more of the steps of implementation 600a may be performed (e.g., completely, partially, and/or the like) by machine learning model system 102 (e.g., one or more devices of machine learning model system 102). In some non-limiting embodiments or aspects, one or more of the steps of implementation 600a may be performed (e.g., completely, partially, and/or the like) by another system, another device, another group of systems, or another group of devices, separate from or including machine learning model system 102, such as database 104 and/or user device 106.

As shown in FIG. 6A, at 602, implementation 600a may include initialization. For example, machine learning model system 102 may determine a first (e.g., baseline) accuracy metric F1_sing based on machine learning models performing a plurality of (single) tasks, as described herein. A current maximum accuracy metric F1_max may be initially set equal to F1_sing. The (single-task) machine learning models may have a number of layers N_sing, and a maximum number of layers N may be set equal to N_sing. Additionally, a counter variable k may be initially set to 0, as described herein. After initialization, implementation 600a may start by proceeding to steps 604 and/or 606.

As shown in FIG. 6A, at 604, implementation 600a may include determining a second accuracy metric F1 (N-k) based on a multitask learning model having a first number of shared layers equal to the number of layers N minus the counter variable k, as described herein.

As shown in FIG. 6A, at 606, implementation 600a may include determining a third accuracy metric F1 (1+k) based on the multitask learning model having a second number of shared layers equal to the counter variable k plus one, as described herein.

As shown in FIG. 6A, at 606, implementation 600a may include comparing the accuracy metric(s). For example, machine learning model system 102 may compare the current maximum accuracy metric F1_max, the second accuracy metric F1 (N-k), and the third accuracy metric F1 (1+k), as described herein. If the second accuracy metric F1 (N-k) is the greatest based on the comparison, implementation 600a may proceed to step 610. If the third accuracy metric F1 (1+k) is the greatest based on the comparison, implementation 600a may proceed to step 612. If the current maximum accuracy metric F1_max is the greatest based on the comparison, implementation 600a may proceed to step 614.

As shown in FIG. 6A, at 610, implementation 600a may include incrementing the counter variable and replacing the current maximum accuracy metric F1_max with the second accuracy metric F1 (N-k), as described herein. After step 610, steps 604 and 608 may be repeated.

As shown in FIG. 6A, at 612, implementation 600a may include incrementing the counter variable and replacing the current maximum accuracy metric F1_max with the third accuracy metric F1 (1+k), as described herein. After step 612, steps 606 and 608 may be repeated.

As shown in FIG. 6A, at 614, implementation 600a may include determining whether a termination condition is satisfied. For example, if the current maximum accuracy metric F1_max still equals the baseline accuracy metric F1_sing (e.g., F1_max has not yet been replaced), the counter variable may be incremented and steps 604, 606, and 608 may be repeated. If the current maximum accuracy metric F1_max does not equal the baseline accuracy metric F1_sing (e.g., F1_max has been replaced at least once), the termination condition is determined to be satisfied and implementation 600a may stop.

Figure 6B:
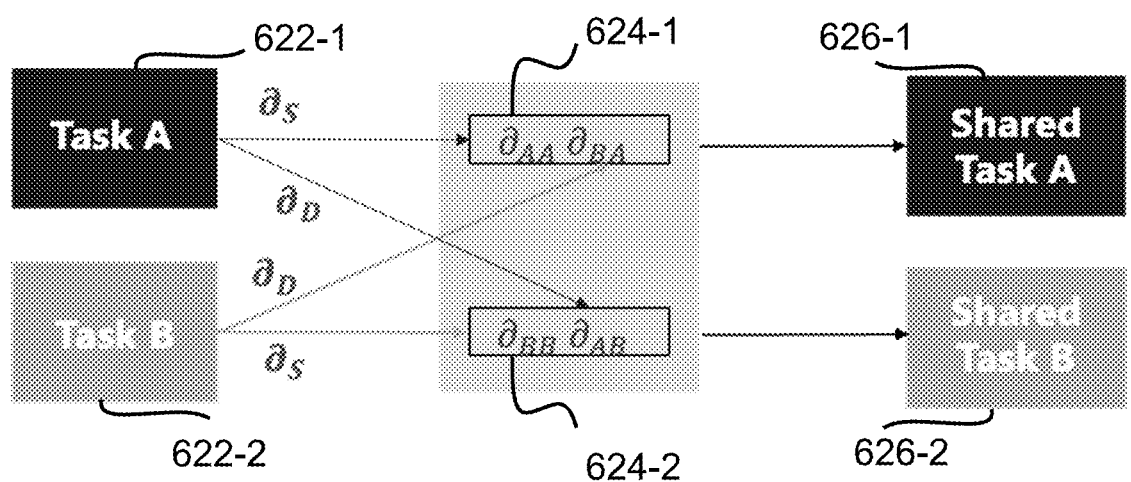

Referring now to FIG. 6B, shown is a schematic diagram of an example implementation 600b of a method for generating and improving multitask learning models, according to some non-limiting embodiments or aspects. The number and arrangement of components shown in FIG. 6B are provided as an example. There may be additional components, fewer components, different components, and/or differently arranged components than those shown in FIG. 6B. In some non-limiting embodiments or aspects, implementation 600b may be implemented (e.g., completely, partially, and/or the like) by machine learning model system 102 (e.g., one or more devices of machine learning model system 102). In some non-limiting embodiments or aspects, implementation 600b may be implemented (e.g., completely, partially, and/or the like) by another system, another device, another group of systems, or another group of devices, separate from or including machine learning model system 102, such as database 104 and/or user device 106.

As shown in FIG. 6B, implementation 600b may include activation values of task-specific layers (e.g., activation values 622-1 of a first task-specific layer, activation values 622-2 of a second task-specific layer, individually referred to as "activation value 622", and collectively referred to as "activation values 622"), intermediate outputs (e.g., intermediate output 624-1 of a first task-specific layer, intermediate output 624-2 of a second task-specific layer, individually referred to as "intermediate output 624", and collectively referred to as "intermediate outputs 624"), task-specific outputs (e.g., task-specific output 626-1 of a first task-specific layer, task-specific output 626-2 of a second task-specific layer, individually referred to as "task-specific output 626", and collectively referred to as "task-specific outputs 626"), and sharing weights (e.g., self-task sharing weight as, different-task sharing weight $\partial_D$), as described herein.

In some non-limiting embodiments or aspects, the activation values 622 of a task-specific layer may be multiplied by the self-task sharing weight $\partial_S$ to generate an intermediate output 624 to be inputted to a next task-specific layer associated with the same task. For example, activation values 622-1 of Task A may be multiplied by the self-task sharing weight as to generate an intermediate output 624-1 (e.g., $\partial_{AA}$), and activation values 622-2 of Task B may be multiplied by the self-task sharing weight $\partial_S$ to generate an intermediate output 624-2 (e.g., $\partial_{BB}$). Additionally or alternatively, the activation values 622 of a task-specific layer may be multiplied by the different-task sharing weight as to generate an intermediate output to be inputted to a next task-specific layer associated with a different task. For example, activation values 622-1 of Task A may be multiplied by the different-task sharing weight $\partial_D$ to generate an intermediate output 624-2 (e.g., $\partial_{AB}$), and activation values 622-2 of Task B may be multiplied by the different-task sharing weight $\partial_D$ to generate an intermediate output 624-1 (e.g., $\partial_{BA}$).

In some non-limiting embodiments or aspects, task-specific outputs 626 may be based on respective intermediate outputs 624. For example, task-specific output 626-1 may be based on intermediate output 624-1, and task-specific output 626-2 may be based on intermediate output 624-2.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:
   determining, with at least one processor, a first accuracy metric based on at least two machine learning models performing a plurality of tasks, each machine learning model of the at least two machine learning models associated with a single task of the plurality of tasks, each machine learning model of the at least two machine learning models having a number of layers;
   receiving, with at least one processor, a multitask learning model comprising at least one shared layer and a plurality of task-specific layers, each task-specific layer of the plurality of task-specific layers associated with one of the plurality of tasks;
   initializing, with at least one processor, a counter variable;
   determining, with at least one processor, a second accuracy metric based on the multitask learning model having a first number of shared layers equal to the number of layers minus the counter variable;
   determining, with at least one processor, a third accuracy metric based on the multitask learning model having a second number of shared layers equal to the counter variable plus one;
   comparing, with at least one processor, the first accuracy metric, the second accuracy metric, and the third accuracy metric;
   repeating, with at least one processor, until at least one termination condition is satisfied:
   incrementing the counter variable;
   at least one of determining the second accuracy metric or determining the third accuracy metric based on comparing the first accuracy metric, the second accuracy metric, and the third accuracy metric and incrementing the counter variable; and
   comparing the first accuracy metric, the second accuracy metric, and the third accuracy metric; and
   determining, with at least one processor, a target number of shared layers for the multitask learning model based on at least one of the second accuracy metric, the third accuracy metric, the first number of shared layers, the second number of shared layers, or any combination thereof.

2. The method of claim 1, wherein the multitask learning model comprises a deep neural network.

3. The method of claim 2, wherein the deep neural network comprises:
   an input layer;
   the at least one shared layer; and
   the plurality of task-specific layers, wherein the plurality of task-specific layers comprise at least one first task-specific layer associated with a first task of the plurality of tasks and at least one second task-specific layer associated with a second task of the plurality of tasks.

4. The method of claim 3, wherein the at least one first task-specific layer comprises a first task-specific output layer, and
   wherein the at least one second task-specific layer comprises a second task-specific output layer.

5. The method of claim 1, wherein the first accuracy metric comprises an average accuracy metric based on a respective accuracy metric for each respective machine learning model of the at least two machine learning models.

6. The method of claim 5, wherein the average accuracy metric comprises a first F1 score,
   wherein each respective accuracy metric comprises a respective F1 score for the respective machine learning model of the at least two machine learning models,
   wherein the second accuracy metric comprises a second F1 score, and
   wherein the third accuracy metric comprises a third F1 score.

7. The method of claim 1, wherein comparing the first accuracy metric, the second accuracy metric, and the third accuracy metric comprises determining that the second accuracy metric is greater than the first accuracy metric and the third accuracy metric,
  wherein repeating at least one of determining the second accuracy metric or determining the third accuracy metric comprises:
  replacing the first accuracy metric with the second accuracy metric; and
  repeating determining the second accuracy metric.

8. A computer program product comprising at least one non-transitory computer-readable medium including program instructions that, when executed by at least one processor, cause the at least one processor to perform the method of claim 7.

9. The method of claim 1, wherein comparing the first accuracy metric, the second accuracy metric, and the third accuracy metric comprises determining that the third accuracy metric is greater than the first accuracy metric and the second accuracy metric,
  wherein repeating at least one of determining the second accuracy metric or determining the third accuracy metric comprises:
  replacing the first accuracy metric with the third accuracy metric; and
  repeating determining the third accuracy metric.

10. A computer program product comprising at least one non-transitory computer-readable medium including program instructions that, when executed by at least one processor, cause the at least one processor to perform the method of claim 9.

11. The method of claim 1, wherein comparing the first accuracy metric, the second accuracy metric, and the third accuracy metric comprises determining that the first accuracy metric is greater than the second accuracy metric and the third accuracy metric,
  wherein repeating at least one of determining the second accuracy metric or determining the third accuracy metric comprises:
  repeating determining the second accuracy metric and determining the third accuracy metric.

12. A computer program product comprising at least one non-transitory computer-readable medium including program instructions that, when executed by at least one processor, cause the at least one processor to perform the method of claim 11.

13. A system comprising:
  at least one processor configured to perform the method of claim 1.

14. A computer program product comprising at least one non-transitory computer-readable medium including program instructions that, when executed by at least one processor, cause the at least one processor to perform the method of claim 1.

15. A computer-implemented method, comprising:
  determining, with at least one processor, a first accuracy metric based on at least two machine learning models performing a plurality of tasks, each machine learning model of the at least two machine learning models associated with a single task of the plurality of tasks;
  receiving, with at least one processor, a first multitask learning model comprising at least one shared layer and a plurality of task-specific layers, each task-specific layer of the plurality of task-specific layers associated with one of the plurality of tasks;
  determining, with at least one processor, a number of shared layers for the first multitask learning model for which at least one second accuracy metric based on the first multitask learning model is improved and is greater than the first accuracy metric;
  receiving, with at least one processor, a second multitask learning model comprising a plurality of sharing weights and a second plurality of task-specific layers, each task-specific layer of the second plurality of task-specific layers associated with one of the plurality of tasks;
  determining, with at least one processor, a value for each sharing weight of the plurality of sharing weights for which at least one third accuracy metric based on the second multitask learning model is improved;
  receiving, with at least one processor, a combined multitask learning model comprising a plurality of shared layers based on the number of shared layers, a second plurality of sharing weights based on the value for each sharing weight of the plurality of sharing weights, and a third plurality of task-specific layers, each task-specific layer of the third plurality of task-specific layers associated with one of the plurality of tasks; and
  generating, with at least one processor, a plurality of predictions based on the combined multitask learning model, the plurality of predication comprising a respective prediction for each of the plurality of tasks,
  wherein each machine learning model of the at least two machine learning models has a number of layers,
  wherein the at least one second accuracy metric comprises a first intermediate accuracy metric and a second intermediate accuracy metric, and
  wherein determining the number of shared layers for the first multitask model comprises:
  initializing a counter variable;
  determining the first intermediate accuracy metric based on the first multitask learning model having a first number of shared layers equal to the number of layers minus the counter variable;
  determining the second intermediate accuracy metric based on the first multitask learning model having a second number of shared layers equal to the counter variable plus one;
  comparing the first accuracy metric, the first intermediate accuracy metric, and the second intermediate accuracy metric;
  repeating until at least one termination condition is satisfied:
  incrementing the counter variable;
  at least one of determining the first intermediate accuracy metric or determining the second intermediate accuracy metric based on comparing the first accuracy metric, the first intermediate accuracy metric, and the second intermediate accuracy metric and incrementing the counter variable; and
  comparing the first accuracy metric, the first intermediate accuracy metric, and the second intermediate accuracy metric; and
  determining the number of shared layers for the first multitask learning model based on at least one of the first intermediate accuracy metric, the second intermediate accuracy metric, the first number of shared layers, the second number of shared layers, or any combination thereof.

16. The method of claim 15, wherein the first multitask learning model comprises a first deep neural network, wherein the second multitask learning model comprises a second deep neural network, and wherein the combined multitask learning model comprises a third deep neural network.

17. The method of claim 15, wherein the first accuracy metric comprises an average accuracy metric based on a respective accuracy metric for each respective machine learning model of the at least two machine learning models.

18. The method of claim 15, wherein the at least one third accuracy metric comprises a plurality of accuracy metrics, and
wherein determining the value for each sharing weight of the plurality of sharing weights comprises:
determining a range of values for the plurality of sharing weights;
determining the plurality of accuracy metrics comprising a respective accuracy metric associated with each respective sharing weight of the plurality of sharing weights having a respective value within the range of values; and
determining the value for each sharing weight of the plurality of sharing weights based on the plurality of accuracy metrics.

19. A system comprising:
at least one processor configured to perform the method of claim 15.

20. A computer program product comprising at least one non-transitory computer-readable medium including program instructions that, when executed by at least one processor, cause the at least one processor to perform the method of claim 15.

* * * * *